US009451519B1

(12) United States Patent
Vivanco et al.

(10) Patent No.: US 9,451,519 B1
(45) Date of Patent: Sep. 20, 2016

(54) SYSTEMS AND METHODS FOR DETERMINING AN ACCESS NODE FOR A WIRELESS DEVICE

(71) Applicant: Sprint Spectrum LP, Overland Park, KS (US)

(72) Inventors: Daniel Vivanco, Sterling, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 182 days.

(21) Appl. No.: 14/256,653

(22) Filed: Apr. 18, 2014

(51) Int. Cl.
*H04W 36/24* (2009.01)

(52) U.S. Cl.
CPC .................................. *H04W 36/24* (2013.01)

(58) Field of Classification Search
CPC ... H04W 36/08; H04W 36/14; H04W 36/30; H04W 36/24
See application file for complete search history.

(56) References Cited

U.S. PATENT DOCUMENTS 6,233,456 B1 * 5/2001 Schiff ................ H04B 7/18541
455/436

* cited by examiner

*Primary Examiner* — Nam Huynh

(57) ABSTRACT

Systems and methods for determining an access node for a wireless device are provided. A source signal level associated with a source access node and a target signal level associated with a target access node may be received from a wireless device. It may be determined that the second access node is operating in a power boosting mode. The wireless device may be instructed to continue communicating with the source access node when the target signal level exceeds the source signal level by less than a first criteria.

18 Claims, 16 Drawing Sheets

SYSTEMS AND METHODS FOR DETERMINING AN ACCESS NODE FOR A WIRELESS DEVICE

TECHNICAL BACKGROUND

Telecommunication systems, such as cellular networks or other wireless networks, use wireless signals to establish communication channels between various network devices. For example, an access node implementing a Third Generation Partnership Project Long Term Evolution (3GPP LTE) protocol or another protocol may transmit a reference signal or a pilot signal over a signal radius, and one or more wireless devices within the signal radius may attempt to establish a connection with the access node based on the reference signal.

In certain circumstances, it may be advantageous to boost or to increase the power of the reference signal transmitted from an access node. For example, where a wireless device uses a reference signal for channel estimation, increasing the reference signal strength can improve ultimate channel quality. Accordingly, power boosting may be performed at an access node such that the signal level of a reference signal, or pilot signal, transmitted by the access node is increased.

OVERVIEW

Systems and methods for determining an access node for a wireless device are provided. A source signal level associated with a source access node and a target signal level associated with a target access node may be received from a wireless device. It may be determined that the target access node is operating in a power boosting mode. The wireless device may be instructed to continue communicating with the source access node when the target signal level exceeds the source signal level by less than a first criteria.

DETAILED DESCRIPTION

Figure 1:
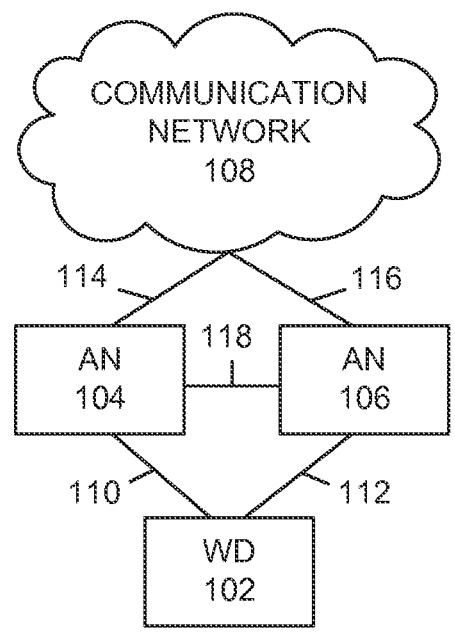
FIG. 1 illustrates an exemplary communication system to determine a communication access node for a wireless device.

FIG. 1 illustrates an exemplary communication system 100 to determine a communication access node for a wireless device comprising wireless device 102, access nodes 104 and 106, communication network 108, and communication links 110, 112, 114, 116 and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access nodes 104 and 106, any number of wireless devices can be implemented.

Access nodes 104 and 106 are network nodes capable of providing wireless communications to wireless device 102, and can be, for example, a base transceiver station, a radio base station, an eNodeB device, or an enhanced eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102, and access node 106 can comprise a candidate access node for wireless device 102.

Although only two access nodes 104 and 106 are illustrated in FIG. 1, wireless device 102 can be in communication with a plurality of access nodes. The plurality of access nodes can be associated with different networks, and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi- MAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, WIMAX, EV-DO, WiMAX, or 3GPP LTE, or combinations thereof. Other wireless protocols can also be used.

Figure 2A:
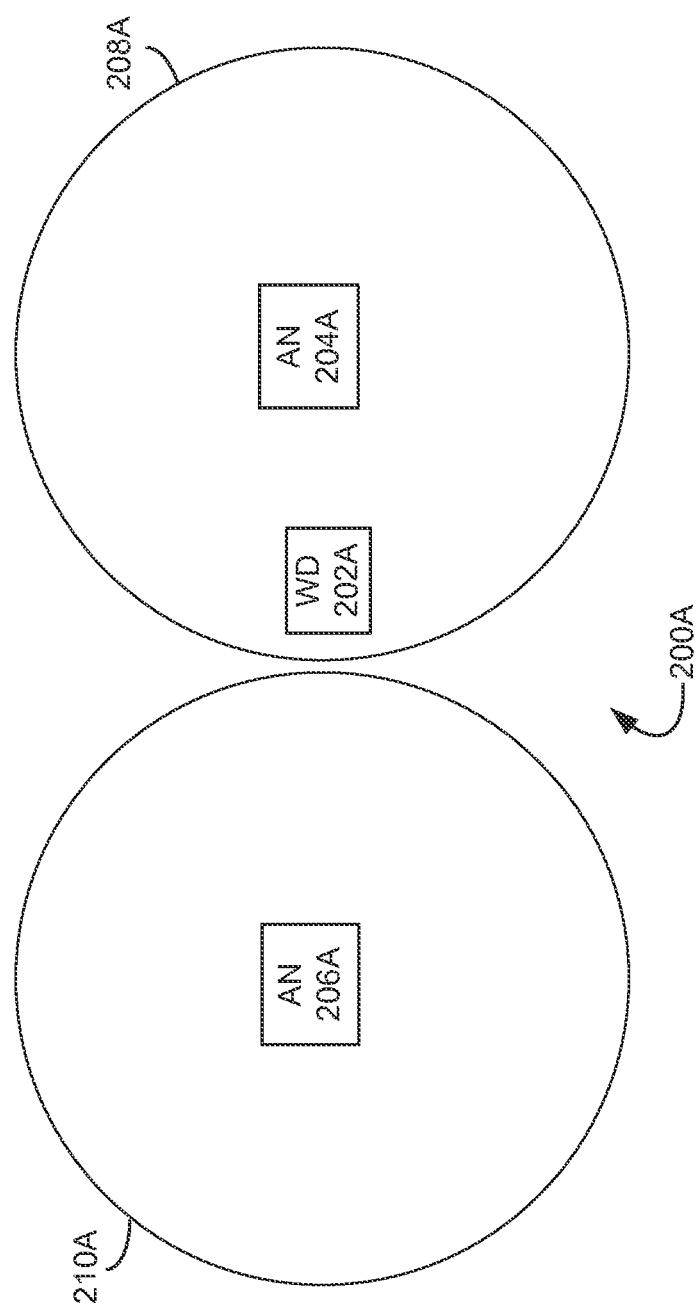
FIGS. 2A and 2B illustrate other exemplary systems to determine a communication access node for a wireless device.
Figure 2B:
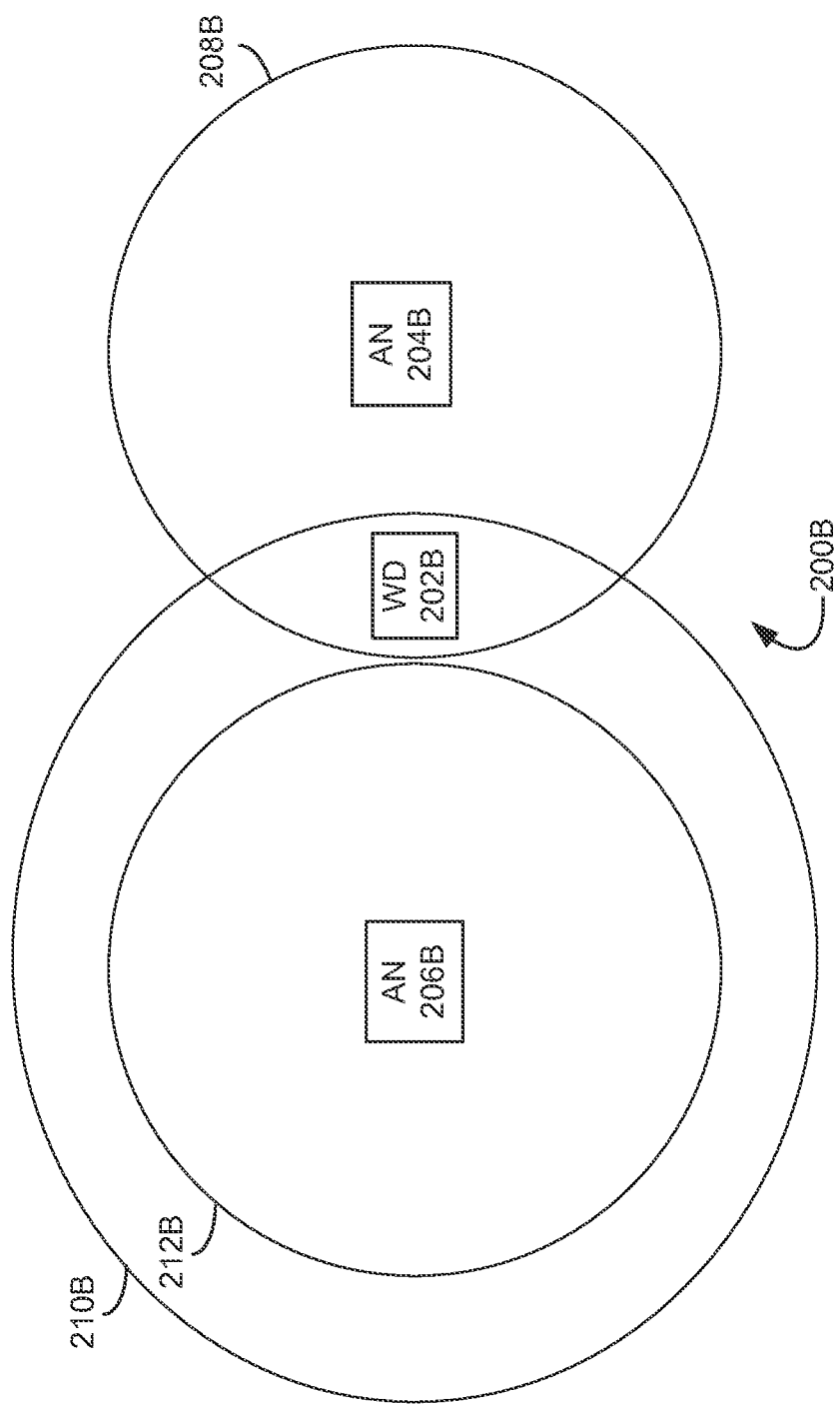

FIGS. 2A and 2B illustrate exemplary communication systems 200A and 200B for providing wireless communications to determine a communication access node for a wireless device. System 200A comprises wireless device 202A and access nodes 204A and 206A. System 200B comprises a wireless device 202B and access nodes 204B and 206B. Wireless devices 202A and 202B may comprise devices similar to wireless device 102 of FIG. 1. Similarly, access nodes 204A, 206A, 204B, and 206B may comprise access nodes similar to access node 104 of FIG. 1. Access node 204A comprises signal radius 208A, access node 206A comprises signal radius 210A, access node 204B comprises signal radius 208B, and access node 206B comprises signal radii 210B and 212B.

A signal radius may comprise an area around an access node within which a wireless device can detect a signal transmitted form the access node. For example, a wireless device located in the signal radius of an access node may detect a signal transmitted from the access node at a signal level greater than a threshold. Signal radii 208A, 210A, and 208B can comprise radii for reference signals, or pilot signals, as well as others signals, such as bearer signals, control signals, and any other suitable signal. Signal radius 210B can comprise a radius for a reference signal, or a pilot signal, while signal radius 212B can comprise a signal radius for other signals, such as bearer signals, control signals, and any other suitable signal. Accordingly, reference signal radius 210B transmitted from access node 206B can be larger than radius 212b for other signals transmitted from access node 206B.

In operation, wireless device 202A may establish communication with access node 204A such that access node 204A provides wireless device 202A access to a communication network (such as communication network 108, illustrated in FIG. 1). Access node 204A may transmit a reference signal, or a pilot signal, over signal radius 208A, to enable wireless device 202A to detect access node 204A. In an embodiment, access node 204A may comprise an eNodeB and the transmitted reference signal may comprise a reference signal or pilot signal, for example, according to a cellular radio access technology, such as 3GPP LTE. When wireless device 202A detects the reference signal from access node 204A, and it is determined that the reference signal from access node 204A meets a threshold signal level, wireless device 202A may attempt to establish communication with access node 204A.

As illustrated in FIG. 2A, wireless device 202A is located within signal radius 208A and is not located within signal radius 210A. Accordingly, wireless device 202A can detect a reference signal transmitted from access node 204A, but cannot detect a reference signal transmitted from access node 206A. Communication system 200B of FIG. 2B may comprise a system similar to communication system 200A of FIG. 2A, however access node 206B may be transmitting a reference signal with increased power. In this example, signal radius 210B is greater than signal radius 210A. Due to this greater radius, wireless device 202B is located within both signal radii 208B and 210B, and subsequently detects a reference signal from both access nodes 204B and 206B.

In an embodiment, power boosting may be performed at an access node to transmit a reference signal from the access node with an increased signal level and, thus, a greater reference signal radius. Power boosting may be performed to increase quality of service (QoS) to wireless devices. For example, a reference signal according to the 3GPP LTE protocol may be used for channel estimation and, ultimately, a boost in the reference signal power can be used to improve channel quality. These improved channel conditions can lead to an improved QoS for the wireless devices communicating with the power boosting access node.

In an embodiment, power boosting may be performed in a multi-antenna configuration according to the 3GPP LTE protocol. For example, an access node may comprise at least two antennas and may implement a Multiple Input Multiple Output (MIMO) protocol for sending (as well as receiving) signals. In an embodiment, when a first of the at least two antennas is transmitting a reference signal, the second antenna may not transmit a signal. Accordingly, when the first antenna is transmitting a reference signal, power boosting of the reference signal may be accomplished by using signal power of the second antenna for the reference signal transmitted from the first antenna. Other suitable processes for increasing the transmitted signal level of a reference signal may also be implemented.

When a wireless device can detect reference signals from multiple access nodes, a decision may be made about which of the multiple access nodes should be selected for communication with the wireless device. For example, a wireless device in communication with a first access node that is moving away from the first access node may detect a reference signal from a second access node. As the wireless device moves further away from the first access node, a signal level of the wireless device's communication with the first access node may decrease to a threshold level, and/or a signal level of the detected reference signal from the second access node may increase to a second threshold level. When one (or both) of the signals meet their respective thresholds, a handover may be performed of the wireless device to the second access node.

As illustrated in FIG. 2B, power boosting of a reference signal from access node 206B may increase the reference signal radius of access node 206B (i.e., reference signal radius 210B). In such case, a wireless device, such as wireless device 202B, may be in communication with access node 204B, and may also detect the reference signal from access node 206B. However, in some embodiments, while reference signal radius 210B is expanded, other signals transmitted from the access node, such as bearer signals, control signals, and any other suitable signals, may not have such an expanded radius (represented by radius 212B). This can result in the reference signal radius of an access node being larger than the signal radius for other signals. Thus, a wireless device that detects a reference signal from an access node performing power boosting may be out of range for other signals transmitted by the access node. In addition, the wireless device may not be capable of transmitting signals with enough power to reach the access node performing power boosting. In such a case, a decision may be made based on the boosted reference signal to perform a handover of the wireless device to the access node performing power boosting. Because of the mismatch between the reference signal radius and other signal radii, performing the handover to the second access node can result in service interruptions such as dropped calls, lagging or poor quality media streams, or other service interruptions.

Where a wireless device detects reference signals from a first access node and a second access node, and one of the access nodes is transmitting a reference signal with boosted power, signal levels for the detected reference signals can be ascertained. For example, the wireless device may determine and report the signal levels for the detected reference signals and, based on the report, the signal levels may be ascertained. The ascertained signal levels may be associated with a first point in time. A first delta (e.g., difference) may be taken between the ascertained signal levels.

Signal levels may again be ascertained for the detected reference signals, where the ascertained signal levels may be associated with a second point in time. A second delta may be taken between the ascertained signal levels associated with the second point in time. Next, a trend may be determined for the wireless device. For example, a first difference may be calculated between the first delta and the second delta, where the first difference may indicate a trend for the wireless device. When the first difference meets a threshold, the wireless device may be instructed to change from communicating with a first of the two access nodes to communicating with a second of the two access nodes.

Figure 3:
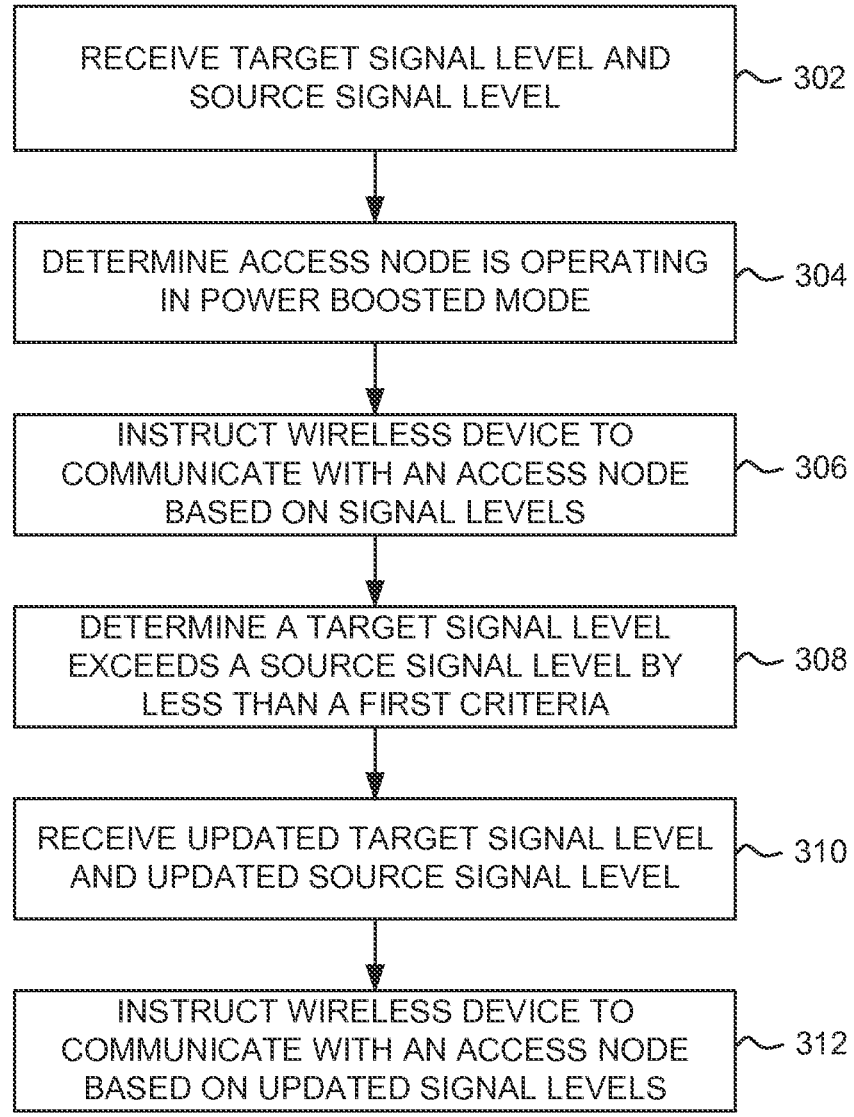
FIG. 3 illustrates an exemplary method of determining a communication access node for a wireless device.

FIG. 3 illustrates an exemplary method for determining an access node for a wireless device. The method will be discussed with reference to the exemplary communication system 200B illustrated in FIG. 2B, however, the method can be implemented with any suitable communication system.

Referring to FIG. 3, at step 302, a target signal level of a signal from a target access node and a source signal level of a signal from a source access node are received. For example, wireless device 202B may detect a signal at a signal level from access node 204B (e.g., source signal level) and a signal at a signal level from access node 206B (e.g., target signal level). The detected signals may comprise reference signals and the signal levels may indicate the signal strength, signal quality, or a combination of these. The signal levels may be represented by received signal strength indication (RSSI), reference signal received power (RSRP), reference signal received quality (RSRQ), signal to noise ratio (SINR), or any other suitable metric. In an embodiment, the signal levels of each detected signal may be determined at the wireless device and then may be communicated to a network element, such as an access node, controller node, or any other suitable network element. For example, the signal levels may be communicated in a measurement report that is associated with a first time, such as a first point in time. Based on the measurement report associated with the first time, signal levels for the signals may be ascertained. The ascertained signal levels may also be associated with the first time.

Next, it is determined that the second access node is transmitting the second signal with a boosted power (step 304). For example, with reference to FIG. 2B, access nodes 204B and 206B may be transmitting a signal, such as a reference signal, over radii 208B and 210B respectively.

In an embodiment, access node 206B may be performing power boosting. For example, access node 206B may comprise at least two antennas and may implement a Multiple Input Multiple Output (MIMO) protocol for sending (as well as receiving) signals. In an embodiment, when a first of the at least two antennas is transmitting a reference signal, the second antenna may not transmit a signal. Accordingly, when the first antenna is transmitting a reference signal, power boosting of the reference signal may be accomplished by using signal power of the second antenna for the reference signal transmitted from the first antenna. Other suitable processes for increasing the transmitted signal level of a reference signal may also be implemented. It may be determined that access node 206B is transmitting a reference signal with a boosted power.

At step 306, it is determined whether a handover of the wireless device to the target access node should be performed. For example, it may be determined that a handover of wireless device 202B to access node 206B should be performed when the target signal level (e.g., associated with access node 206B) exceeds the source signal level (e.g., associated with access node 204B) by greater than or equal to the first criteria.

In an embodiment, the wireless device may be instructed to remain in communication with the source access node when the target signal level exceeds the source signal level by less than the first criteria. For example, wireless device 202B may be instructed to remain in communication with access node 204B when the received target signal level (e.g., the signal level associated with access node 206B) exceeds the received source signal level (e.g., the signal level associated with access node 204B) by less than the first criteria.

In an embodiment, the first criteria may be based on a past source signal level (e.g., a past source signal level associated with access node 204B received from wireless device 202B) and a past target signal level (e.g., a past target signal level associated with access node 206B received from wireless device 202B). For example, a first delta may be calculated between the past target signal level and the past source signal level. In an embodiment, the first criteria may comprise a sum of the first delta and a threshold. The threshold may comprise an offset, a hysteresis, or any other suitable threshold.

At step 308, it is determined that the target signal level exceeds the source signal level by less than the first criteria. For example, wireless device 202B may be instructed to remain in communication with access node 204B when the received target signal level (e.g., the signal level associated with access node 206B) exceeds the received source signal level (e.g., the signal level associated with access node 204B) by less than the first criteria At step 310, an updated target signal level of a signal from the target access node and an updated source signal level of a signal from the source access node are received. For example, wireless device 202B may detect a signal at an updated signal level from access node 204B (e.g., source signal level) and a second signal at an updated signal level from access node 206B (e.g., target signal level). In an embodiment, the signal levels of each detected signal may be determined at the wireless device and then may be communicated to a network element, such as an access node, controller node, or any other suitable network element. For example, the signal levels may be communicated in a measurement report that is associated with a second time, such as a second point in time. Based on the measurement report associated with the second time, updated signal levels for the signals may be ascertained. The ascertained signal levels may also be associated with the second time.

At step 312, it is determined whether a handover of the wireless device to the target access node should be performed. For example, it may be determined that a handover of wireless device 202B to access node 206B should be performed when the updated target signal level (e.g., associated with access node 206B) exceeds the updated source signal level (e.g., associated with access node 204B) by greater than or equal to a second criteria.

In an embodiment, the wireless device may be instructed to remain in communication with the source access node when the updated target signal level exceeds the updated source signal level by less than the second criteria. For example, wireless device 202B may be instructed to remain in communication with access node 204B when the updated target signal level (e.g., the signal level associated with access node 206B) exceeds the updated source signal level (e.g., the signal level associated with access node 204B) by less than the second criteria.

Figure 4:
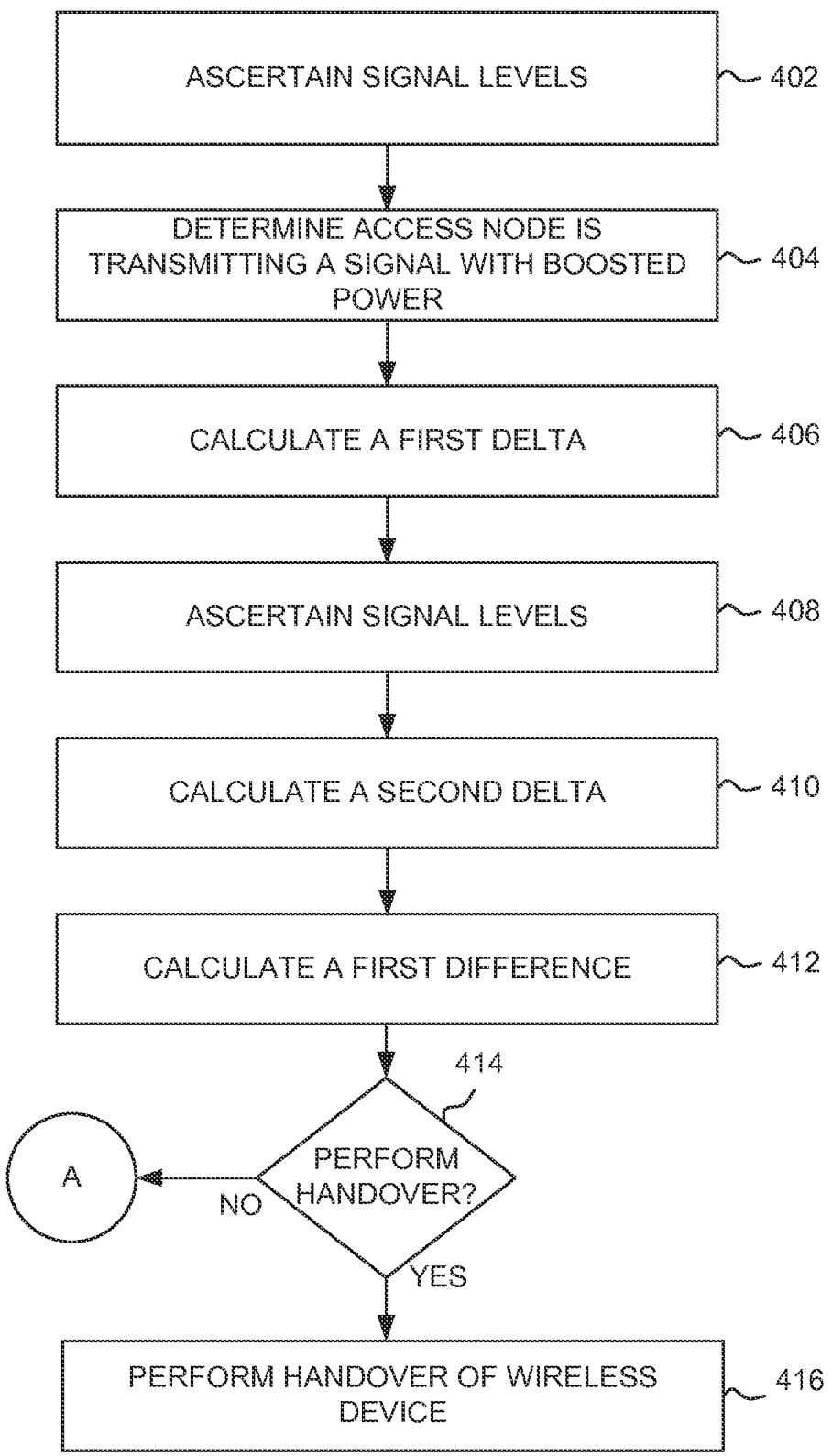
FIG. 4 illustrates another exemplary method of determining a communication access node for a wireless device.
Figure 4:
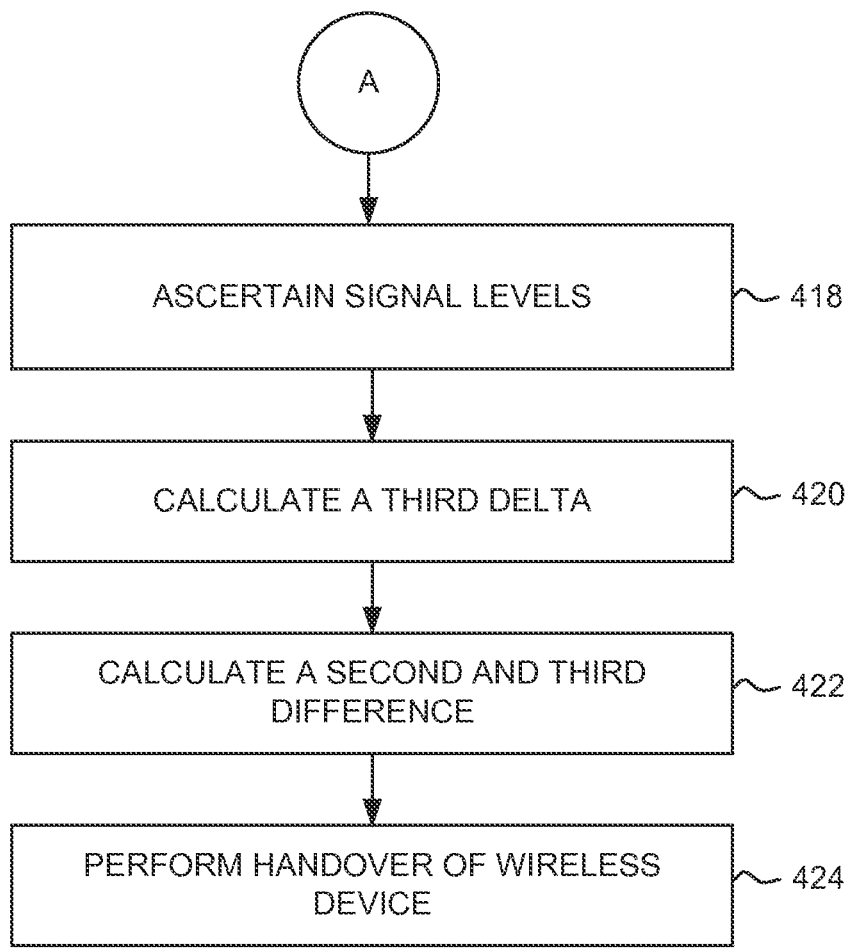

In an embodiment, the second criteria may be based on the source signal level (e.g., received at step 302) and target signal level (e.g., received at step 302). For example, a second delta may be calculated between the target signal level and the source signal level. In an embodiment, the second criteria may comprise a sum of the second delta and a threshold. The threshold may comprise an offset, a hysteresis, or any other suitable threshold. FIG. 4 illustrates an exemplary method for determining an access node for a wireless device. The method will be discussed with reference to the exemplary communication system 200B illustrated in FIG. 2B, however, the method can be implemented with any suitable communication system.

Referring to FIG. 4, at step 402, a first signal level of a first signal from a first access node and a second signal level of a second signal from a second access node are ascertained. For example, wireless device 202B may detect a first signal at a signal level from access node 204B and a second signal at a signal level from access node 206B. The detected signals may comprise reference signals and the signal levels may indicate the signal strength, signal quality, or a combination of these. The signal levels may be represented by received signal strength indication (RSSI), reference signal received power (RSRP), reference signal received quality (RSRQ), signal to noise ratio (SINR), or any other suitable metric. In an embodiment, the signal levels of each detected signal may be determined at the wireless device and then may be communicated to a network element, such as an access node, controller node, or any other suitable network element. For example, the signal levels may be communicated in a measurement report that is associated with a first time, such as a first point in time. Based on the measurement report associated with the first time, signal levels for the first signal and the second signal may be ascertained. The ascertained signal levels may also be associated with the first time.

Next, it is determined that the second access node is transmitting the second signal with a boosted power (step 404). For example, with reference to FIG. 2B, access nodes 204B and 206B may be transmitting a signal, such as a reference signal, over radii 208B and 210B respectively.

In an embodiment, access node 206B may be performing power boosting. For example, access node 206B may comprise at least two antennas and may implement a Multiple Input Multiple Output (MIMO) protocol for sending (as well as receiving) signals. In an embodiment, when a first of the at least two antennas is transmitting a reference signal, the second antenna may not transmit a signal. Accordingly, when the first antenna is transmitting a reference signal, power boosting of the reference signal may be accomplished by using signal power of the second antenna for the reference signal transmitted from the first antenna. Other suitable processes for increasing the transmitted signal level of a reference signal may also be implemented. It may be determined that access node 206B is transmitting a reference signal with a boosted power.

At step 406, a first delta is calculated. For example, a delta (i.e., a difference) between a first signal level, such as the first signal level ascertained at step 402, and a second signal level, such as the second signal level ascertained at step 402, may be calculated.

At step 408, a third signal level of the first signal from the first access node and a fourth signal level of the second signal from the second access node are ascertained For example, at wireless device 202B, a first signal, such as a reference signal, may be detected from access node 204B and a second signal, such as a reference signal, may be detected from access node 206B, and the signal levels for each reference signal may be determined at the wireless device. As described above, the signal levels may be determined and communicated to another network element in a measurement report, where the measurement report may be associated with a second time, such as a second point in time, after the first time. Based on the measurement report, signal levels for the first signal and the second signal may be ascertained. The ascertained signal levels may also be associated with the second time.

At step 410, a second delta is calculated. For example, a delta (i.e., a difference) between a third signal level, such as the third signal level ascertained at step 408, and a fourth signal level, such as the fourth signal level ascertained at step 408, may be calculated. At step 412, a first difference is calculated. For example, a first difference may be calculated as the difference between the first delta and the second delta.

At step 414, it is determined whether a handover of the wireless device to the second access node should be performed. For example, it may be determined that a handover of wireless device 202B to access node 206B should be performed when the first difference meets a threshold. The threshold may be a predetermined value, static value, or any other suitable threshold. When it is determined that a handover should be performed, at step 416, a handover of the wireless device to the second access node is performed. When it is determined that a handover should not be performed, the process may continue with the method of FIG. 4.

At step 418, when the first difference is not above a threshold, a fifth signal level of the first signal from the first access node and a sixth signal level of the second signal from the second access node are ascertained. For example, wireless device 202B, may detect a first signal from access node 204B and a second signal from access node 206B, and the signal levels for each signal may be determined at the wireless device. The ascertained signal levels may be associated with a third time such as a third point in time, after the second point in time. As described herein, the signal levels may be determined and communicated to another network element in a measurement report, where the measurement report may be associated with the third time. Based on the measurement report associated with the third time, signal levels for the first signal and the second signal may be ascertained. The ascertained signal levels may also be associated with the third time.

At step 420, a third delta is calculated. For example, a delta (i.e., difference) between a fifth signal level, such as the fifth signal level ascertained at step 418, and a sixth signal level, such as the sixth signal level ascertained at step 418, may be calculated.

At step 422, a second difference and a third difference are calculated. For example, a second difference may be calculated as the difference between the second delta and the third delta. A third difference may be further calculated. For example, a third difference may be calculated as a difference between the first difference and the second difference.

At step 424, a handover is performed of the wireless device to the second access node based on the third difference. In an example, where wireless device 202B may be in communication with access node 204B and access node 206B may be performing power boosting. In this example, wireless device 202B can be instructed to change from communicating with access node 204B to communicating with access node 206B when the third difference meets a threshold. The threshold may be a predetermined value, static value, or any other suitable threshold.

Figure 5:
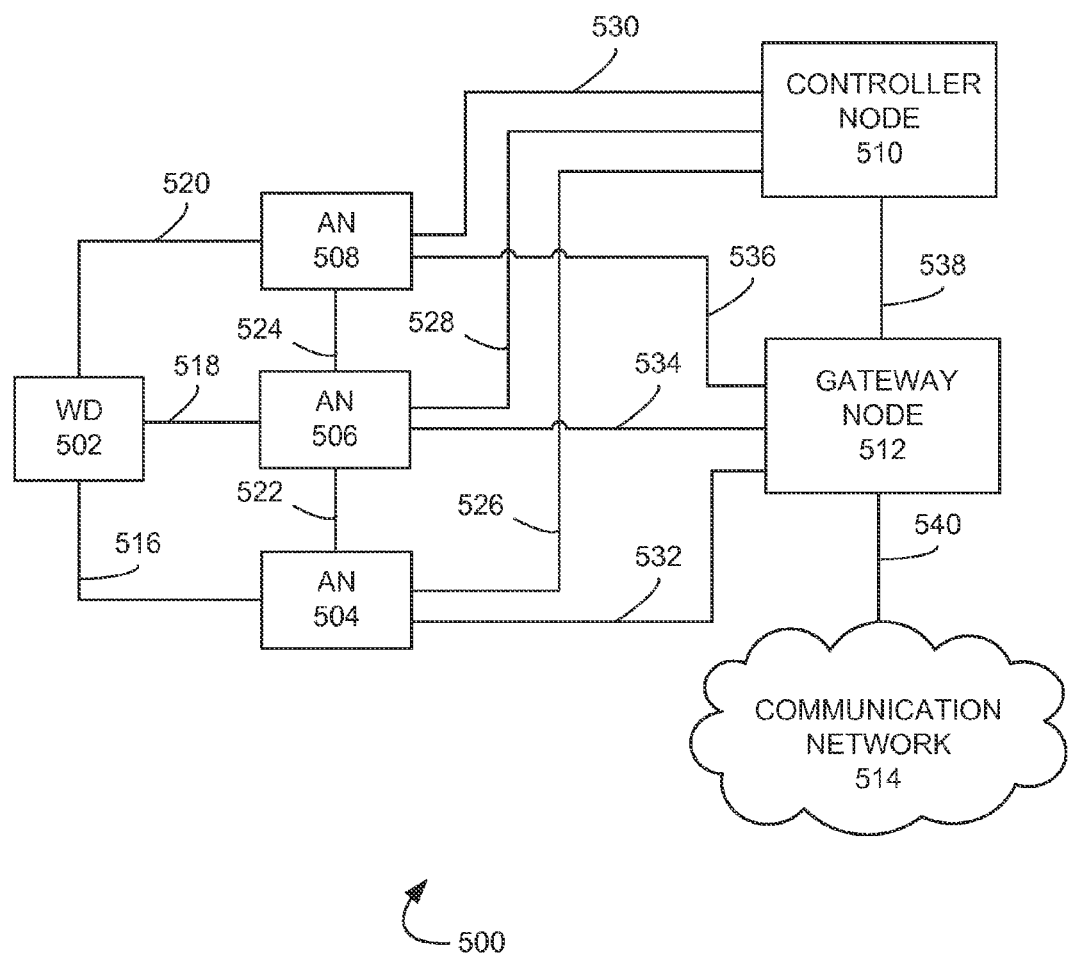
FIG. 5 illustrates another exemplary system to determine a communication access node for a wireless device

FIG. 5 illustrates another exemplary communication system 500 to determine a communication access node for a wireless device. Communication system 500 comprises a wireless device 502, access nodes 504, 506, and 508, controller node 510, gateway node 512, communication network 514, and network links 516, 518, 520, 522, 524, 526, 528, 530, 532, 534, 536, 538, and 540. Other network elements may be present in the communication system 500 to facilitate communication but are omitted for clarity, such as base stations, base station controllers, gateways, mobile switching centers, dispatch application processors, and location registers such as a home location register or visitor location register.

Wireless device 502 can be any device configured to communicate over communication system 500 using a wireless communication link. For example, wireless device 502 can include a cell phone, a smart phone, a computing platform such as a laptop, palmtop, or a tablet, a personal digital assistant, or an internet access device, and combinations thereof.

Access nodes 504, 506, and 508 are network nodes capable of providing wireless communications to wireless device 502, and can be, for example, a base transceiver station, a radio base station, an eNodeB device, or an enhanced eNodeB device. In an embodiment, access node 504 can comprise a serving access node for wireless device 502, and access nodes 506 and 508 can comprise candidate access nodes for wireless device 502. Access nodes 504, 506, and 508 may communicate with controller node 510 over communication links 526, 528, and 530, and with gateway node 512 over communication links 532, 534, and 536. Access nodes 504, 506, and 508 may also communicate directly with each other over communication links 522 and 524.

Controller node 510 can be any network node configured to manage services within system 500. Controller node 500 may provide other control and management functions for system 500. The controller node 510 can comprise a single device having various functions or a plurality of devices having differing functions. For example, controller node 510 can include at least one of a multi-cell/multicast coordination entity (MCE), a mobility management entity (MME), a radio network controller (RNC), a mobile switching center (MSC), and a combination thereof.

Controller node 510 can comprise a processor and associated circuitry to execute or direct the execution of computer-readable instructions to obtain information. Controller node 510 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 510 can receive instructions and other input at a user interface.

Gateway node 512 is a network element which can comprise a processor and associated circuitry to execute or direct the execution of computer-readable instructions. Gateway node 512 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 512 can provide instructions to access nodes 504, 506, and 508 related to channel selection in communications with wireless device 502. For example, gateway node 512 can comprise at least one of a serving gateway (SGW), a packet data network gateway (PDNGW), a cellular gateway (CGW), and a combination thereof. Gateway node 512 may communicate with controller node 510 over communication link 538 and with communication network 514 over communication link 540.

Communication network 514 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 514 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 514 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 516, 518, 520, 522, 524, 526, 528, 530, 532, 534, 536, 538, and 540 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 504, 506, and 508, controller node 510, gateway node 512, and communication network 514 which are omitted for clarity, including additional processing nodes, routers, gateways, and physical and/or wireless data links for carrying data among the various network elements.

Figure 6:
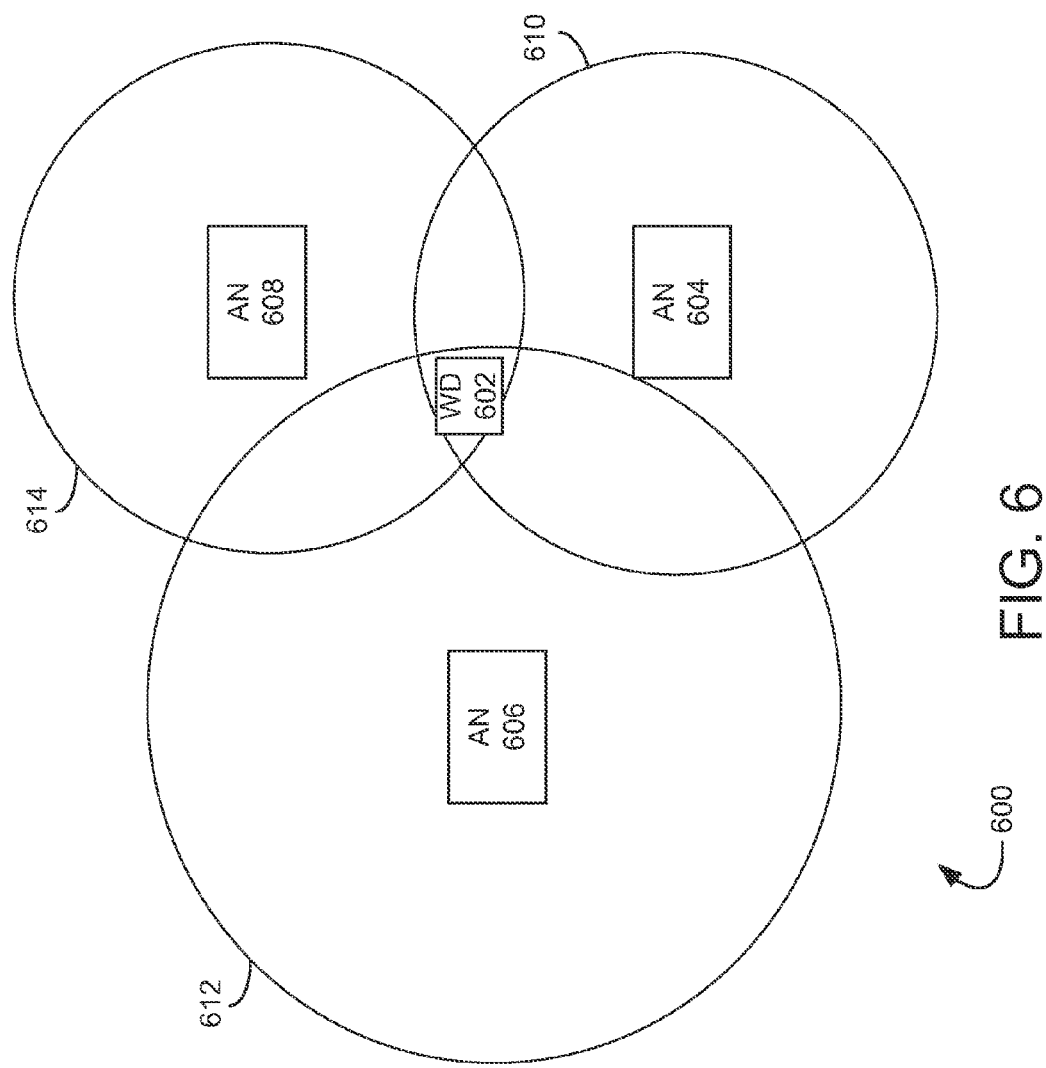
FIG. 6 illustrates another exemplary system to determine a communication access node for a wireless device.

FIG. 6 illustrates an exemplary communication system 600 for providing wireless communications to determine a communication access node for a wireless device. System 600 comprises a wireless device 602, access nodes 604, 606, and 608, and signal radii 610, 612, and 614. Wireless devices 602 may comprise a device similar to wireless device 502 of FIG. 5. Similarly, access nodes 604, 606, and 608 may comprise access nodes similar to access nodes 504, 506, and 508 of FIG. 5.

Access nodes 604, 606, and 608 may each transmit signals, such as reference signals, over signal radii 610, 612, and 614 respectively, as illustrated. Access node 604 may be performing power boosting such that a signal transmitted from access node 604, such as a reference signal, may be transmitted with a boosted power. Accordingly, signal radius 612 may be larger than signal radii 610 and 614, as illustrated.

In an embodiment, wireless device 602 may be in communication with access node 604 and wireless device 602 may detect the reference signals transmitted from access nodes 604, 606, and 608. In this example, a decision may be made about which of the multiple access nodes should be selected for communication with wireless device 602. For example, a wireless device in communication with a first access node that is moving away from the first access node may detect a reference signal from a second access node. As the wireless device moves further away from the first access node, a signal level of the wireless device's communication with the first access node may decrease to a threshold level, and/or a signal level of the detected reference signal from the second access node may increase to a second threshold level. When one (or both) of the signals meet their respective thresholds, a handover may be performed of the wireless device to the second access node.

In an embodiment where a wireless device receives reference signals from multiple access nodes and one of those access nodes is performing power boosting, a handover policy, such as a power boosting handover policy, may be used to determine which access node should be selected to communicate with the wireless device. The method of FIG. 7 may further illustrate such a policy.

Figure 7:
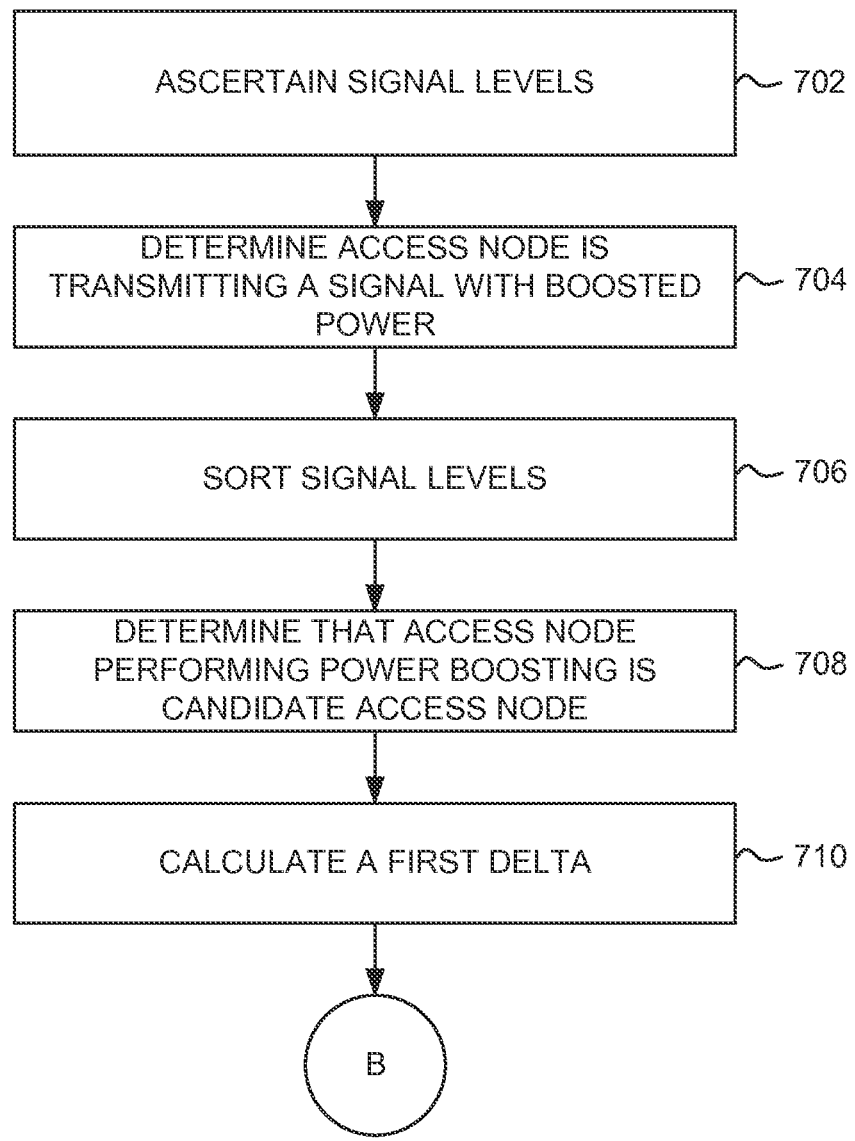
FIG. 7 illustrates another exemplary method of determining a communication access node for a wireless device.

FIG. 7 illustrates an exemplary method for determining an access node for a wireless device. The method will be discussed with reference to the exemplary communication system 600 illustrated in FIG. 6, however, the method can be implemented with any suitable communication system.

Referring to FIG. 7, at step 702, a first signal level of a first signal from a first access node, a second signal level of a second signal from a second access node, and a third signal level of a third signal from a third access node are ascertained. For example, wireless device 602 may detect a first signal at a signal level from access node 604, a second signal at a signal level from access node 606, and a third signal at a signal level from access node 608. The detected signals may comprise reference signals and the signal levels may indicate the signal strength, signal quality, or a combination of these. For example, the signal levels may be represented by received signal strength indication (RSSI), reference signal received power (RSRP), reference signal received quality (RSRQ), signal to noise ratio (SINR), or any other suitable metric. In an embodiment, the signal levels of each detected signal may be determined at the wireless device and then may be communicated to a network element, such as an access node, controller node, or any other suitable network element. For example, the signal levels may be communicated in a measurement report that is associated with a first time, such as a first point in time. Based on the measurement report, signal levels for the first signal, the second signal, and the third signal may be ascertained. The ascertained signal levels may also be associated with the first time.

At step 704, it is determined that the second access node is transmitting the second signal with a boosted power. For example, with reference to FIG. 6, access nodes 604, 606, and 608 may be transmitting a signal, such as a reference signal, over signal radii 610, 612, and 614. It may be determined that access node 606 is transmitting a reference signal with a boosted power.

In an embodiment, access node 606 may be performing power boosting. For example, access node 606 may comprise at least two antennas and may implement a Multiple Input Multiple Output (MIMO) protocol for sending (as well as receiving) signals. In an embodiment, when a first of the at least two antennas is transmitting a reference signal, the second antenna may not transmit a signal. Accordingly, when the first antenna is transmitting a reference signal, power boosting of the reference signal may be accomplished by using signal power of the second antenna for the reference signal transmitted from the first antenna. Other suitable processes for increasing the transmitted signal level of a reference signal may also be implemented. It may be determined that access node 606 is transmitting a reference signal with a boosted power.

For example, it may be determined that an access node is transmitting a signal with boosted power based on a power boosting list. The power boosting list may comprise information that identifies access nodes which are performing power boosting. In an embodiment, access nodes 604, 606, 608, and any other suitable network element may store a power boosting list. When access node 606 begins performing power boosting, access node 606 may communicate this information to another network element, such as a controller node, access nodes adjacent to access node 606, such as access nodes 604 and 608, or any other suitable network element. Access nodes 604 and 608, or any other suitable network element, may then update their power boosting lists to indicate that adjacent access node 606 is performing power boosting. A network element, such as access node 604, may then determine that access node 606 is power boosting according to the power boosting list. For example, access node 604 may determine that access node 606 is power boosting based on accessing a power boosting list stored at access node 604 or receiving an indication that access node 606 is power boosting from another network element that stores a power boosting list (e.g., an access node, a gateway, a controller node, and the like). In an embodiment, any other suitable process may be implemented to determine that an access node is transmitting a signal with boosted power.

At step 706, the ascertained signal levels are sorted. For example, the ascertained signal levels for the signals from access nodes 604, 606, and 608 may be sorted according to signal level. In an embodiment, the signals may be sorted according to RSSI, RSRP, RSRQ, SINR, or any other suitable metric.

At step 708, it is determined that the access node performing power boosting comprises the candidate access node. For example, a candidate access node for a handover may be determined based on the sorted signal levels from step 706. A candidate access node may be an access node determined to be a potential target access node for a handover. In an embodiment where access node 604 is in communication with wireless device 602, one of access nodes 606 or 608 may be determined to be the candidate access node. For the following examples, a first signal may be transmitted from access node 604, a second signal may be transmitted from access node 606, and a third signal may be transmitted from access node 608. Additionally, access node 604 may be in communication with wireless device 602 and the second signal may be transmitted with a boosted power.

In a first example, after sorting, the first signal may comprise the highest signal level. Here, no handover may be performed because access node 604 is already in communication with wireless device 602. In a second example, after sorting, the third signal may comprise the highest signal level. Here, access node 608 may be determined to be the candidate access node and a handover to access node 608 may be performed according to any handover procedure commonly known in the art.

In a third example, after sorting, the second signal may comprise the highest signal level, the third signal may comprise the second highest signal level, and the first signal may comprise the least signal level. Here, access node 608 (e.g., the access node transmitting the third signal) may be determined to be the candidate access node. When signals from two access nodes (e.g., access nodes 606 and 608) have a higher signal level than the signal from the access node in communication with the wireless device (e.g., access node 604), the access node that is not performing power boosting is given priority (e.g., access node 608). Accordingly, access node 608 is determined to be the candidate access node. A handover to access node 608 may be performed according to any handover procedure commonly known in the art.

In an embodiment of the third example, access node 606 may be determined to be the candidate access node. For example, a delta may be calculated between the second signal and the third signal. The access node transmitting the second signal (e.g., access node 606) may be determined to be the candidate access node when the delta is greater than a threshold. In other words, a priority for the access node not performing power boosting may be disregarded when the delta between signal levels is above a threshold. Accordingly, when the second signal is greater than the third signal by a threshold level, the candidate access node may be determined to be access node 606.

In a fourth example, after sorting, the second signal may comprise the highest signal level, the first signal may comprise the second highest signal level, and the third signal may comprise the least signal level. Here, access node 606 (e.g., the access node transmitting the second signal) may be determined to be the candidate access node. When the signal level for a signal from an access node performing power boosting (e.g., access node 606) is the only signal level higher than the signal level for a signal from the access node in communication with the mobile device (e.g. access node 604), the access node performing power boosting (e.g. access node 606) is determined to be the candidate access node. Accordingly, access node 606 is determined to be the candidate access node. In this example, the method of FIG. 7 may continue to step 710.

Figure 10:
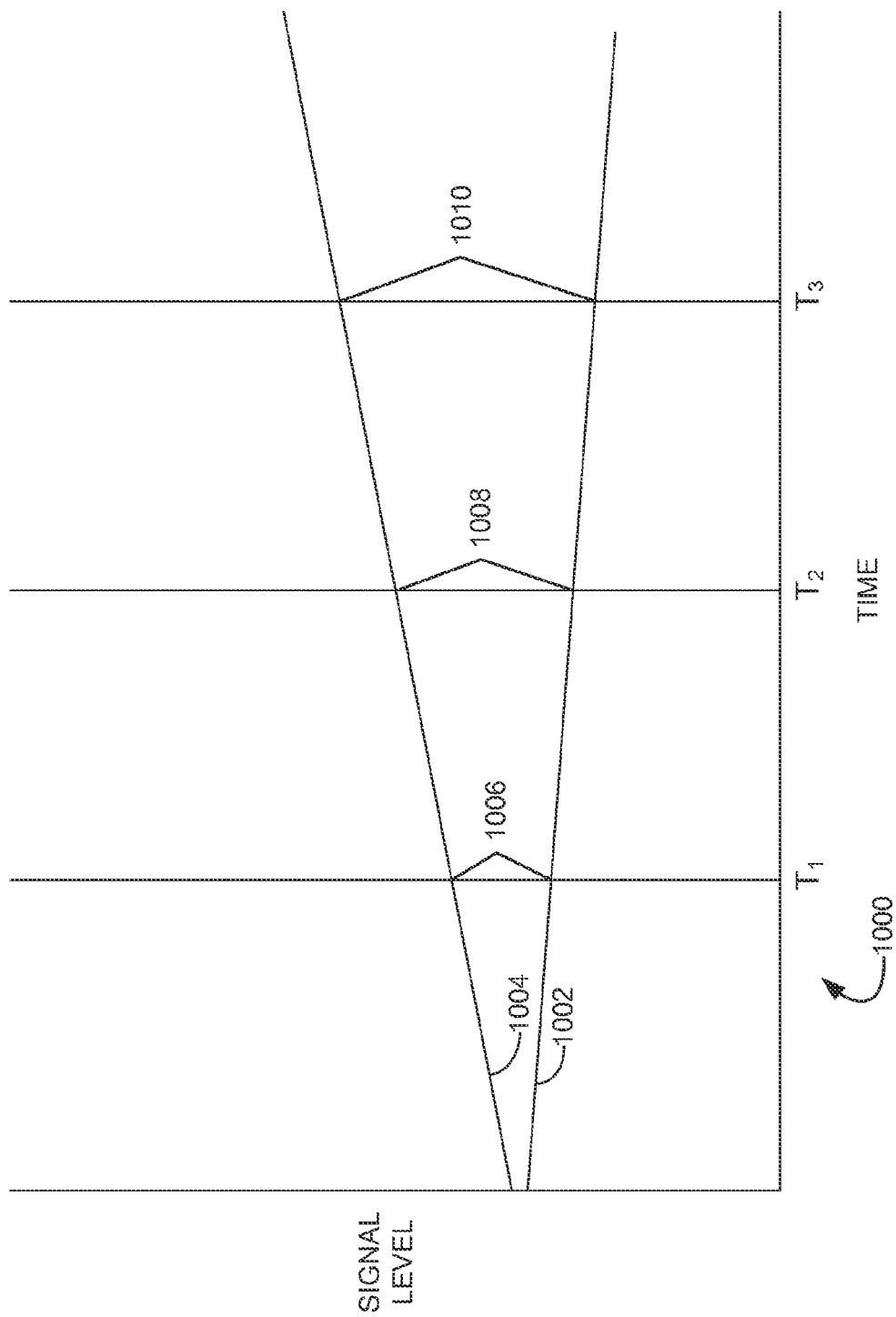
FIG. 10 illustrates an exemplary graph of signal levels for signals received from a plurality of access nodes.

At step 710, a first delta is calculated. For example, a delta (i.e., a difference) between a first signal level, such as the first signal level ascertained at step 702, and a second signal level, such as the second signal level ascertained at step 702, may be calculated. This can be expressed as: At $T_1$, $SL_2 - SL_1 = \Delta_1$, where $T_1$=the first time, $SL_1$=the first signal level, $SL_2$=the second signal level, and $\Delta_1$=the first delta. FIG. 10 further illustrates the first delta.

FIG. 10 illustrates graph 1000 that comprises signals levels for signals from a plurality of access nodes according to an embodiment. Graph 1000 represents the x-axis as time and the y-axis as signal level. Line 1002 represents the signal level for a signal from an access node, such as access node 604, over time. Line 1004 represents the signal level for a signal from an access node that is performing power boosting, such as access node 606, over time. A first point in time, a second point in time, and a third point in time are represented by the lines $T_1$, $T_2$, and $T_3$ respectively. In an example, the intersection of line 1002 and line $T_1$ may represent the signal level of a signal from access node 604 at the first time, such as the signal level ascertained in step 702. Similarly, the intersection of line 1004 and line $T_1$ may represent the signal level of a signal from access node 606 at the first time, such as the signal level ascertained in step 702. Accordingly, the difference between the signal level for a signal from access node 604 at the first time and the signal level for a signal from access node 606 at the first time is represented by the first delta 1006.

Figure 8:
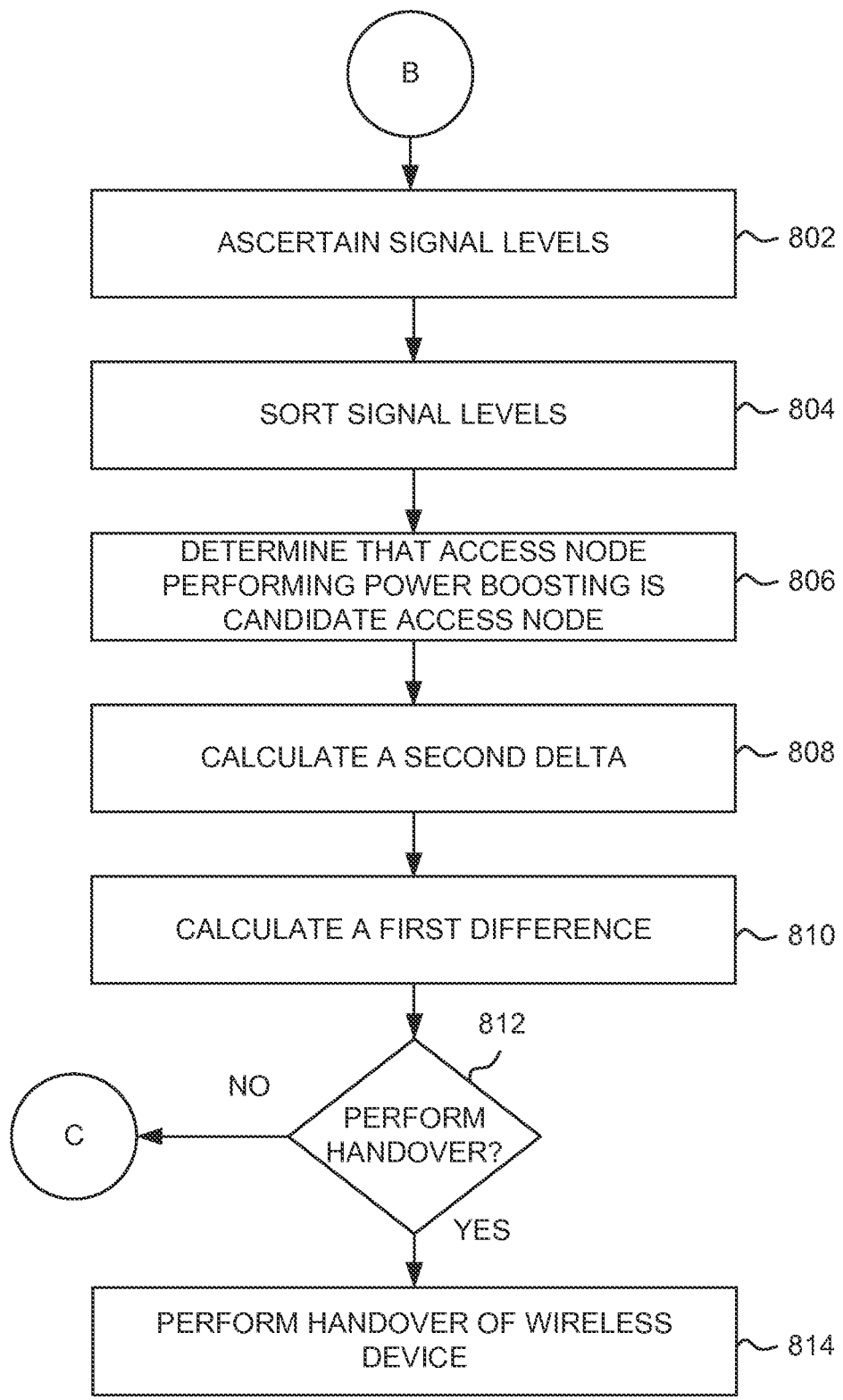
FIG. 8 illustrates another exemplary method of determining a communication access node for a wireless device.

The method of FIG. 7 may proceed with steps from the method of FIG. 8. For example, step 710 of FIG. 7 may be followed by step 802 of FIG. 8. FIG. 8 illustrates an exemplary method for determining an access node for a wireless device. The method will be discussed with reference to the exemplary communication system 600 illustrated in FIG. 6, however, the method can be implemented with any suitable communication system.

At step 802, a fourth signal level of the first signal from the first access node, a fifth signal level of the second signal from the second access node, and a sixth signal level of the third signal from the third access node are ascertained. For example, wireless device 602 may detect a first signal at a signal level from access node 604, a second signal at a signal level from access node 606, and a third signal at a signal level from access node 608. The detected signals may comprise reference signals and the signal levels may indicate the signal strength, signal quality, or a combination of these. For example, the signal levels may be represented by received signal strength indication (RSSI), reference signal received power (RSRP), reference signal received quality (RSRQ), signal to noise ratio (SINR), or any other suitable metric. In an embodiment, the signal levels of each received signal may be determined at the wireless device and then may be communicated to a network element, such as an access node, controller node, or any other suitable network element. For example, the signal levels may be communicated in a measurement report that is associated with a second time, such as a second point in time after the first point in time. Based on the measurement report, signal levels for the first signal, the second signal, and the third signal may be ascertained. The ascertained signal levels may be associated with the second time.

At step 804, the ascertained signal levels are sorted. For example, the ascertained signal levels for the signals from access nodes 604, 606, and 608 may be sorted according to signal level. In an embodiment, the signals may be sorted according to RSSI, RSRP, RSRQ, SINR, or any other suitable metric.

At step 806, it is determined that the access node performing power boosting is the candidate access node for a handover. For example, a candidate access node for a handover may be determined based on the sorted signal levels for the access nodes from step 804. The candidate access node may be determined in a similar manner as described with reference to step 708 of FIG. 7. When the candidate access node is determined to be an access node performing power boosting, such as access node 606, the method of FIG. 8 may continue to step 808.

At step 808, a second delta is calculated. For example, a delta (i.e., a difference) between a fourth signal level, such as the fourth signal level ascertained at step 802, and a fifth signal level, such as the fifth signal level ascertained at step 802, may be calculated. This can be expressed as: At $T_2$, $SL_5 - SL_4 = \Delta_2$, where $T_2$=the second time, $SL_4$=the fourth signal level, $SL_5$=the fifth signal level, and $\Delta_2$=the second delta. FIG. 10 further illustrates the second delta. Referring to graph 1000 of FIG. 10, line $T_2$ represents a second time, such as a second point in time after the first point in time. In an example, the intersection of line 1002 and line $T_2$ may represent the signal level of a signal from access node 604 at the second time, such as the signal level ascertained in step 802. Similarly, the intersection of line 1004 and line $T_2$ may represent the signal level of a signal from access node 606 at the second time, such as the signal level ascertained in step 802. Accordingly, the difference between the signal level for a signal from access node 604 at the second time and the signal level for a signal from access node 606 at the second time is represented by the second delta 1008.

At step 810, a first difference is calculated. For example, a first difference may be calculated as the difference between the first delta and the second delta. This can be expressed as: $\Delta_2 - \Delta_1 = D_1$, where $\Delta_1$=the first delta, $\Delta_2$=the second delta, and $D_1$=the first difference.

At step 812, it is determined whether a handover of the wireless device to the second access node should be performed. For example, it may be determined that a handover of wireless device 202B to access node 206B should be performed when the first difference is greater than a threshold. This can be expressed as: $D_1 > E_1$, where $D_1$=the first difference and $E_1$=a first threshold. The threshold may be a predetermined value, static value, or any other suitable threshold.

In an embodiment, the handover determination may be based on a comparison between the first delta and the second delta. For instance, a comparison between the first delta and the second delta may indicate a trend for the wireless device, and the decision to perform a handover may be based on the indicated trend. In this example, it may be determined that a handover of wireless device 602 to access node 606 should be performed when the second delta is greater than the first delta plus an offset. This can be expressed as: $\Delta_2 > \Delta_1 + O$, where $\Delta_1$=the first delta, $\Delta_2$=the second delta, and O=an offset. The offset may be a predetermined value, static value, or any other suitable offset.

In an embodiment, the handover determination may be based on a comparison between the second delta and a first criteria. For example, the first criteria may comprise the first delta and an offset. In this example, it may be determined that a handover of wireless device 602 to access node 606 should be performed when the second delta is greater than the first criteria (e.g., the first delta plus an offset). This can be expressed as: $\Delta_2 > \Delta_1 + O$, where $\Delta_1$=the first delta, $\Delta_2$=the second delta, and O=an offset. The offset may be a predetermined value, static value, or any other suitable offset.

In an embodiment, a rate may be calculated, and the handover determination may be based on the first difference and the rate. For instance, a rate may indicate a trend for the wireless device, and the decision to perform a handover may be based on the indicated trend. In an example, a change in signal may be calculated as the difference between the first delta and the second delta. A change in time may be calculated as the difference between a first time, such as the first time at step 702 of FIG. 7, and a second time, such as the second time at step 802. The signal difference and the time difference may be used to determine a rate, for instance, by dividing the signal difference by the time difference. In this example, it may be determined that a handover of wireless device 602 to access node 606 should be performed when the calculated first difference is greater than a first threshold and the calculated rate is greater than a second threshold. This can be expressed as: $D_1 > E_1$ AND $\Delta_{signal}/\Delta_{Time} > E_2$, where $D_1$=the first difference, $E_1$=a first threshold, $\Delta_{signal}$=the change in signal, $\Delta_{Time}$=the change in time, and $E_2$=a second threshold. The thresholds may be predetermined values, static values, or any other suitable thresholds.

In an embodiment, the handover determination may be based on a comparison between the second delta and a first criteria. For example, the first criteria may comprise the first delta, a change in time, and a threshold rate. In an example, a change in time may be calculated as the difference between a first time, such as the first time at step 702 of FIG. 7, and a second time, such as the second time at step 802. A threshold rate may comprise a threshold change in signal over time. Here, it may be determined that a handover of wireless device 602 to access node 606 should be performed when the second delta is greater than the first criteria. This can be expressed as: $\Delta_2 > \Delta_1 + R \times \Delta_{Time}$, where $\Delta_1$=the first delta, $\Delta_2$=the second delta, $\Delta_{Time}$=the change in time, and R=the threshold rate.

In an embodiment, the handover determination may be based on a comparison between the second delta and a first criteria, where the first criteria comprises an offset criteria and a rate criteria. For example, a first part of the first criteria may comprise the first delta and an offset and a second part of the first criteria may comprise the first delta, a change in time, and a threshold rate. Here, it may be determined that a handover of wireless device 602 to access node 606 should be performed when the second delta is greater than the first criteria. This can be expressed as: $\Delta_2 > \Delta_1 + O$ AND $\Delta_2 > \Delta_1 + R \times \Delta_{Time}$, where $\Delta_1$=the first delta, $\Delta_2$=the second delta, O=an offset, $\Delta_{Time}$=the change in time, and R=the threshold rate.

When it is determined that a handover should be performed, a handover of the wireless device to the second access node is performed (at step 814). For example, wireless device 602 may be instructed to change from communication with access node 604 to communicating with access node 606. When it is determined that a handover should not be performed, the process may continue with the method of FIG. 9. In an example, when the first difference is not above a threshold, a handover to access node 606 is not performed. In another example, when the first difference is not above a first threshold or the rate is not above a second threshold, a handover to access node 606 is not performed.

Figure 9:
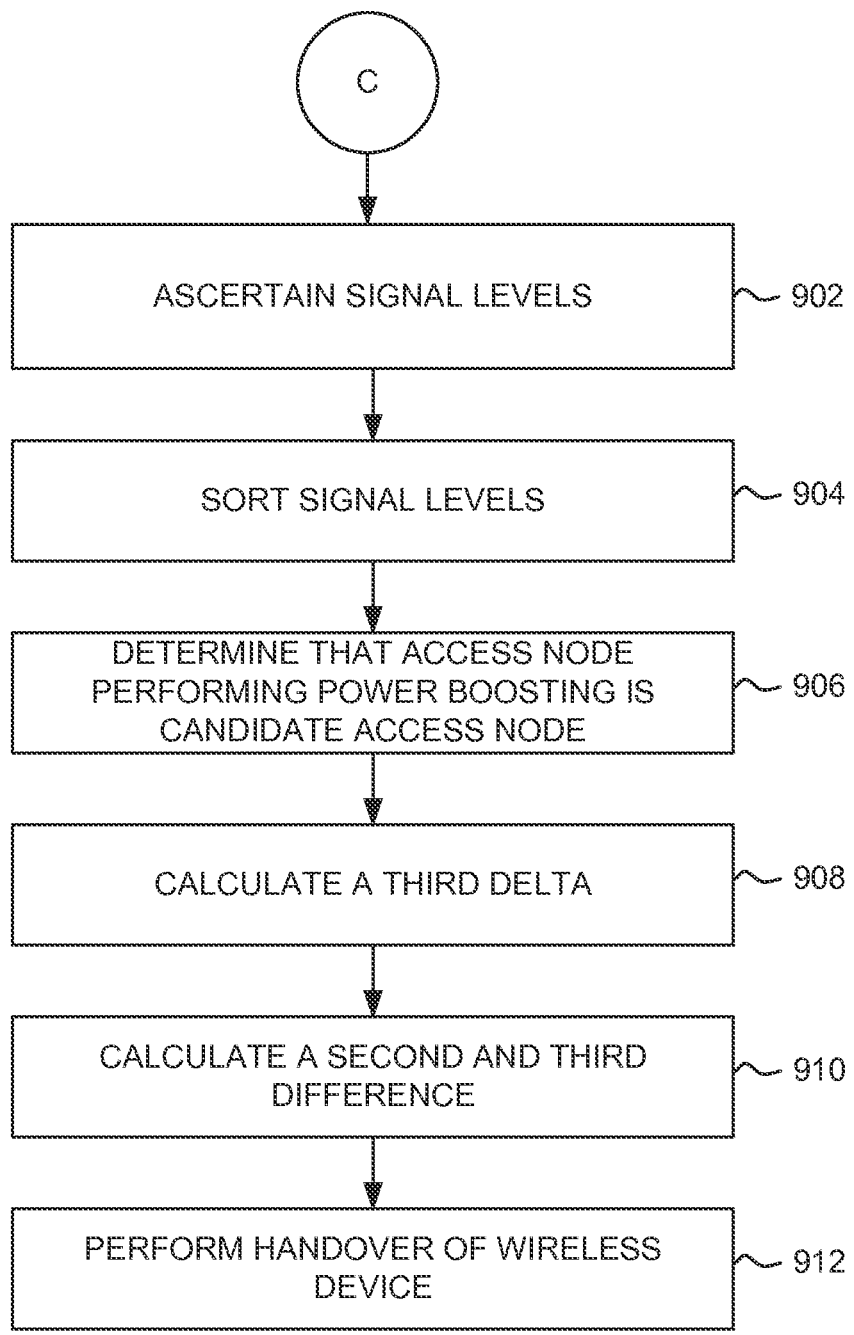
FIG. 9 illustrates another exemplary method of determining a communication access node for a wireless device.

FIG. 9 illustrates another flow chart of an exemplary method for determining an access node for a wireless device in accordance with an embodiment. The method will be discussed with reference to the exemplary communication systems 600 illustrated in FIG. 6, however, the method can be implemented with any suitable communication system.

Referring to FIG. 9, at step 902, a seventh signal level of the first signal from the first access node, an eighth signal level of the second signal from the second access node, and a ninth signal level of the third signal from the third access node may be ascertained. For example, wireless device 602 may detect a first signal at a signal level from access node 604, a second signal at a signal level from access node 606, and a third signal at a signal level from access node 608. The detected signals may comprise reference signals and the signal levels may indicate the signal strength, signal quality, or a combination of these. For example, the signal levels may be represented by received signal strength indication (RSSI), reference signal received power (RSRP), reference signal received quality (RSRQ), signal to noise ratio (SINR), or any other suitable metric. In an embodiment, the signal levels of each detected signal may be determined at the wireless device and then may be communicated to a network element, such as an access node, controller node, or any other suitable network element. For example, the signal levels may be communicated in a measurement report that is associated with a third time, such as a third point in time after the second point in time. Based on the measurement report, signal levels for the first signal, the second signal, and the third signal may be ascertained. The ascertained signal levels may also be associated with the third time.

At step 904, the ascertained signal levels are sorted. For example, the ascertained signal levels for the signals from access nodes 604, 606, and 608 may be sorted according to signal level. In an embodiment, the signals may be sorted according to RSSI, RSRP, RSRQ, SINR, or any other suitable metric.

At step 906, it is determined that the access node performing power boosting is the candidate access node for a handover. For example, a candidate access node for a handover may be determined based on the sorted signal levels for the access nodes from step 904. The candidate access node may be determined in a similar manner as described with reference to step 708 of FIG. 7. Where the candidate access node is determined to be an access node performing power boosting, such as access node 606, the method of FIG. 9 may continue to step 908.

At step 908, a third delta is calculated For example, a delta (i.e., a difference) between a seventh signal level, such as the seventh signal level ascertained at step 902, and an eighth signal level, such as the eighth signal level ascertained at step 902, may be calculated. This can be expressed as: At $T_3$, $SL_8 - SL_7 = \Delta_3$, where $T_3$=the third time, $SL_7$=the seventh signal level, and $SL_8$=the eighth signal level, and $\Delta_3$=the third delta. FIG. 10 further illustrates the third delta.

Referring to graph 1000 of FIG. 10, line $T_3$ represents a third time, such as a third point in time after the second point in time. In an example, the intersection of line 1002 and line $T_3$ may represent the signal level of a signal from access node 604 at the third time, such as the signal level ascertained in step 902. Similarly, the intersection of line 1004 and line $T_3$ may represent the signal level of a signal from access node 606 at the third time, such as the signal level ascertained in step 902. Accordingly, the difference between the signal level for a signal from access node 604 at the third time and the signal level for a signal from access node 606 at the third time is represented by the third delta 1010.

At step 910, a second difference and a third difference are calculated. For example, a first difference may be calculated as the difference between the second delta and the third delta. This can be expressed as: $\Delta_3 - \Delta_2 = D_2$, where $\Delta_2$=the second delta, $\Delta_3$=the third delta, and $D_2$=the second difference.

A third difference may be further calculated as a difference between the first difference and the second difference. This can be expressed as: $D_2 - D_1 = D_3$, where $D_1$=the first difference, $D_2$=the second difference, and $D_3$=the third difference.

At step 912, the wireless device may be instructed to perform a handover based on the third difference. For instance, the third difference may indicate a trend for the wireless device, and the decision to perform a handover may be based on the indicated trend. In an example, wireless device 602 may be in communication with access node 604 and access node 606 may be performing power boosting. In this example, wireless device 602 can be instructed to change from communicating with access node 604 to communicating with access node 606 when the third difference is greater than a third threshold. This can be expressed as: $D_3 > E_3$, where $D_3$=the third difference and $E_3$=a third threshold. The third threshold may be a predetermined value, static value, or any other suitable threshold.

In an embodiment, the wireless device may be instructed to perform a handover based on a comparison between the first delta, the second delta, and the third delta. For instance, the comparison between the first delta, the second delta, and the third delta may indicate a trend for the wireless device, and the decision to perform a handover may be based on the indicated trend. In this example, wireless device 602 can be instructed to change from communicating with access node 604 to communicating with access node 606 when the third delta minus the second delta is greater than the second delta minus the first delta plus an offset. This can be expressed as: $\Delta_3 - \Delta_2 > \Delta_2 - \Delta_1 + O$, where $\Delta_1$=the first delta, $\Delta_2$=the second delta, $\Delta_3$=the third delta, and O=an offset. The offset may be a predetermined value, static value, or any other suitable offset.

In an embodiment, the handover determination may be based on a comparison between the third delta and a second criteria. For example, the second criteria may comprise the second delta and an offset. In this example, it may be determined that a handover of wireless device 602 to access node 606 should be performed when the third delta is greater than the second criteria (e.g., the second delta plus an offset). This can be expressed as: $\Delta_3 > \Delta_2 + O$, where $\Delta_2$=the second delta, $\Delta_3$=the third delta, and O=an offset. The offset may be a predetermined value, static value, or any other suitable offset.

In an embodiment, a rate may be calculated, and the wireless device may be instructed to perform a handover based on the third difference and the rate. For instance, the rate may indicate a trend for the wireless device, and the decision to perform a handover may be based on the indicated trend. In an example, a change in signal may be calculated as the difference between the first delta and the third delta. A change in time may be calculated as the difference between a first time, such as the first time at step 702 of FIG. 7, and a third time, such as the third time at step 902. The signal difference and the time difference may be used to determine a rate, for instance, by dividing the change in signal by the change in time. In this example, wireless device 602 can be instructed to change from communicating with access node 604 to communicating with access node 606 when the calculated third difference is greater than a third threshold and the calculated rate is greater than a fourth threshold. This can be expressed as: $D_3 > E_3$ AND $\Delta_{Signal}/\Delta_{Time} > E_4$, where $D_3$=the third difference, $E_3$=a third threshold, $\Delta_{signal}$=the change in signal, $\Delta_{Time}$=the change in time, and $E_4$=a fourth threshold. The thresholds may be predetermined values, static values, or any other suitable thresholds.

In an embodiment, a rate may be calculated based on the second time and the third time. For example, the change in time may be calculated as the difference between a second time, such as the second time at step 802 of FIG. 8, and a third time, such as the third time at step 902. In this example, the change in signal may be calculated as the difference between the second delta and the third delta. Accordingly, the signal difference and the time difference may be used to determine the rate, for instance, by dividing the change in signal by the change in time.

In an embodiment, the handover determination may be based on a comparison between the third delta and a second criteria. For example, the second criteria may comprise the first delta, a change in time, and a threshold rate. In an example, a change in time may be calculated as the difference between a first time, such as the first time at step 702 of FIG. 7, and a third time, such as the third time at step 902. A threshold rate may comprise a threshold change in signal over time. Here, it may be determined that a handover of wireless device 602 to access node 606 should be performed when the third delta is greater than the second criteria. This can be expressed as: $\Delta_3 > \Delta_1 + R \times \Delta_{Time}$, where $\Delta_1$=the first delta, $\Delta_3$=the third delta, $\Delta_{Time}$=the change in time, and R=the threshold rate.

In an embodiment, a rate may be calculated based on the second time and the third time. For example, the change in time may be calculated as the difference between a second time, such as the second time at step 802 of FIG. 8, and a third time, such as the third time at step 902. In this example, the second criteria may be based on the second delta. This can be expressed as: $\Delta_3 > \Delta_2 + R \times \Delta_{Time}$, where $\Delta_2$=the second delta, $\Delta_3$=the third delta, $\Delta_{Time}$=the change in time, and R=the threshold rate.

In an embodiment, the handover determination may be based on a comparison between the third delta and a second criteria, where the second criteria comprises an offset criteria and a rate criteria. For example, a first part of the second criteria may comprise the second delta and an offset and a second part of the second criteria may comprise the first delta (or the second delta, as described herein), a change in time, and a threshold rate. Here, it may be determined that a handover of wireless device 602 to access node 606 should be performed when the third delta is greater than the second criteria. This can be expressed as: $\Delta_3 > \Delta_2 + O$ AND $\Delta_3 > \Delta_1 + R \times \Delta_{Time}$, where $\Delta_1$=the first delta, $\Delta_2$=the second delta, $\Delta_3$=the third delta, O=an offset, $\Delta_{Time}$=the change in time, and R=the threshold rate. In an embodiment, the change in time may be based off the second time and the third time and the above equation can be expressed as: $\Delta_3 > \Delta_2 + O$ AND $\Delta_3 > \Delta_2 + R \times \Delta_{Time}$, where $\Delta_2$=the second delta, $\Delta_3$=the third delta, O=an offset, $\Delta_{Time}$=the change in time, and R=the threshold rate.

Figure 11:
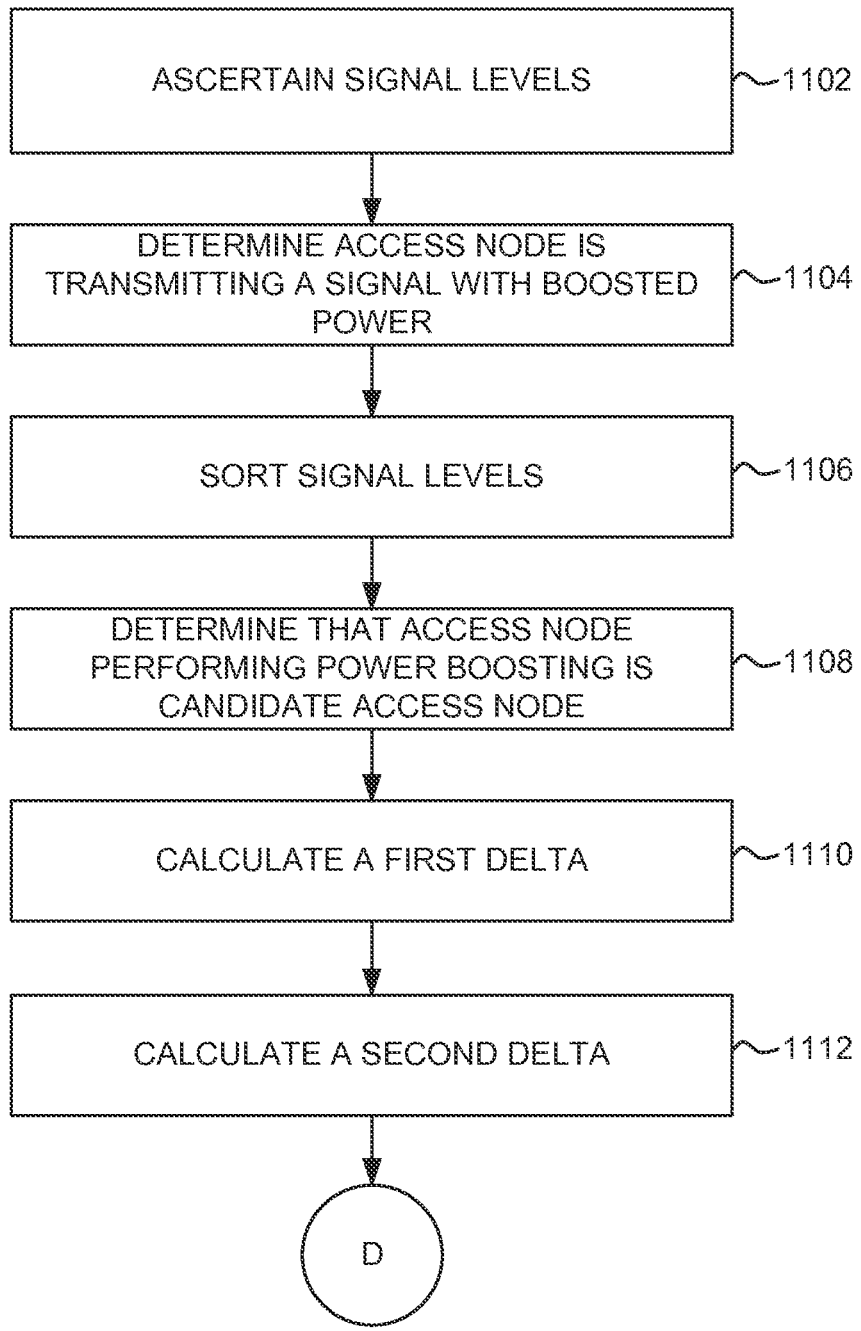
FIG. 11 illustrates another exemplary method of determining a communication access node for a wireless device.

FIG. 11 illustrates another exemplary method for determining an access node for a wireless device. The method will be discussed with reference to the exemplary communication system 600 illustrated in FIG. 6, however, the method can be implemented with any suitable communication system. The method of FIG. 11 may comprise steps similar to the method of FIG. 7.

Referring to FIG. 11, steps 1102-1108 may be similar to steps 702-708 of FIG. 7. For example, at step 1102, a first signal level of a first signal from a first access node, a second signal level of a second signal from a second access node, and a third signal level of a third signal from a third access node are ascertained. In this example, wireless device 602 may detect a first signal at a signal level from access node 604, a second signal at a signal level from access node 606, and a third signal at a signal level from access node 608. At step 1104, it is determined that the second access node is transmitting the second signal with a boosted power. At step 1106, the ascertained signal levels are sorted. And at step 1108, it is determined that the access node performing power boosting comprises the candidate access node.

Figure 13:
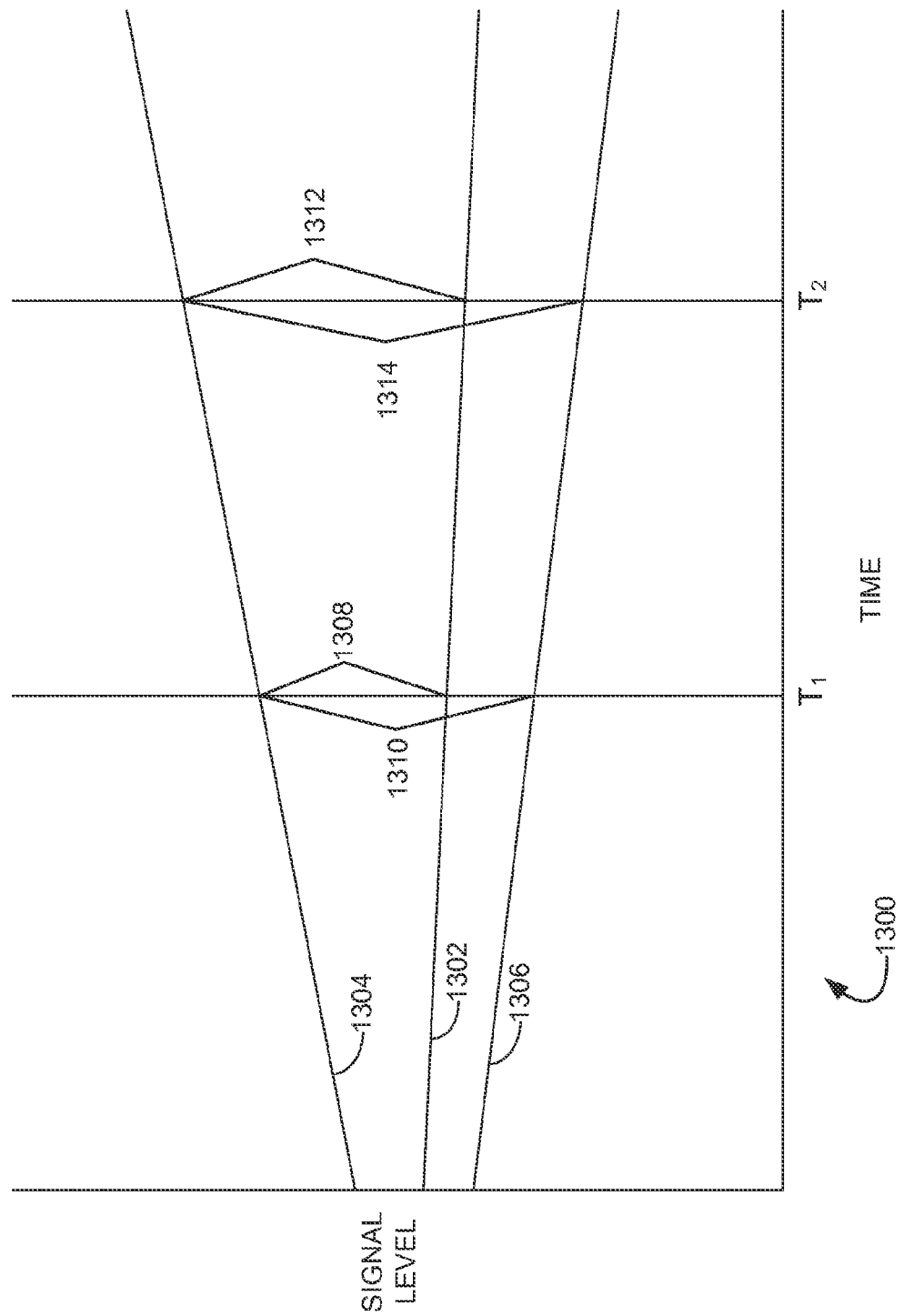
FIG. 13 illustrates another exemplary method of determining a communication access node for a wireless device.

At step 1110, a first delta is calculated. For example, a first delta (i.e., a difference) between a first signal level, such as the first signal level ascertained at step 1102, and a second signal level, such as the second signal level ascertained at step 1102, may be calculated. This can be expressed as: At $T_1$, $SL_2 - SL_1 = \Delta_1$, where $T_1$=the first time, $SL_1$=the first signal level, $SL_2$=the second signal level, and $\Delta_1$=the first delta. FIG. 13 further illustrates the first delta.

FIG. 13 illustrates graph 1300 that comprises signals levels for signals from a plurality of access nodes according to an embodiment. Graph 1300 may be similar to graph 1000 of FIG. 10. Graph 1300 represents the x-axis as time and the y-axis as signal level. Line 1302 represents the signal level for a signal from a first access node, such as access node 604, over time. Line 1304 represents the signal level for a signal from a second access node that is performing power boosting, such as access node 606, over time. Line 1306 represents the signal level for a signal from a third access node, such as access node 608, over time. A first point in time and a second point in time are represented by the lines $T_1$ and $T_2$, respectively. In an example, the intersection of line 1302 and line $T_1$ may represent the signal level of a signal from access node 604 at the first time, such as the signal level ascertained in step 1102. Similarly, the intersection of line 1304 and line $T_1$ may represent the signal level of a signal from access node 606 at the first time, such as the signal level ascertained in step 1102. Accordingly, the difference between the signal level for a signal from access node 604 at the first time and the signal level for a signal from access node 606 at the first time is represented by the first delta 1308.

At step 1112, a second delta is calculated. For example, a second delta (i.e., a difference) between a second signal level, such as the second signal level ascertained at step 1102, and a third signal level, such as the third signal level ascertained at step 1102, may be calculated. This can be expressed as: At $T_1$, $SL_3 - SL_2 = \Delta_2$, where $T_1$=the first time, $SL_2$=the second signal level, $SL_3$=the third signal level, and $\Delta_2$=the second delta. FIG. 13 further illustrates the second delta. Referring to graph 1300 of FIG. 13, line $T_1$ represents a first time, such as a first point in time. In an example, the intersection of line 1304 and line $T_1$ may represent the signal level of a signal from access node 606 at the first time, such as the signal level ascertained in step 1102. Similarly, the intersection of line 1306 and line $T_1$ may represent the signal level of a signal from access node 608 at the second time, such as the signal level ascertained in step 1102. Accordingly, the difference between the signal level for a signal from access node 606 at the first time and the signal level for a signal from access node 608 at the first time is represented by the second delta 1310.

Figure 12:
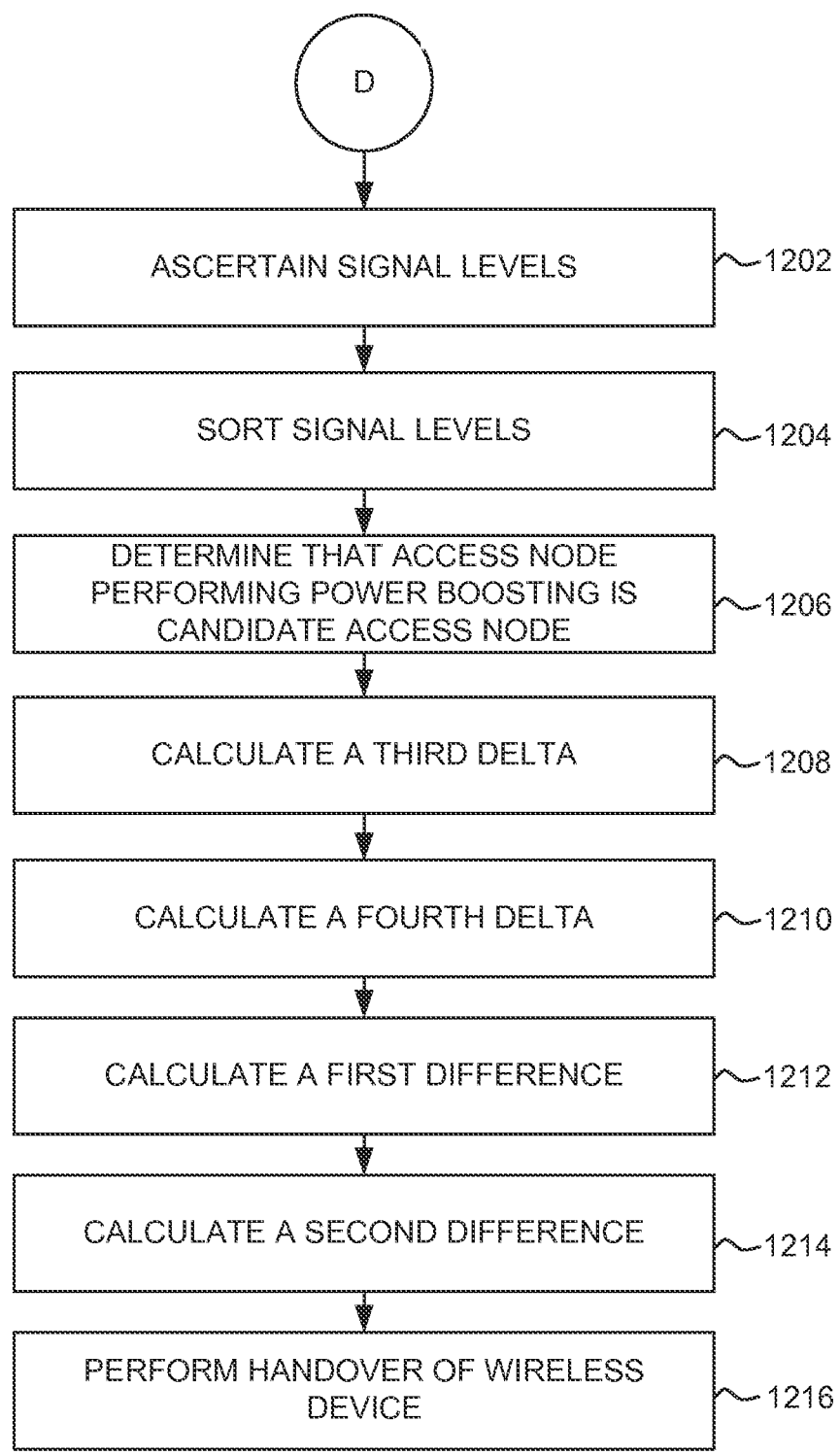
FIG. 12 illustrates another exemplary method of determining a communication access node for a wireless device.

The method of FIG. 11 may proceed with steps from the method of FIG. 12. For example, step 1110 of FIG. 11 may be followed by step 1202 of FIG. 12. FIG. 12 illustrates an exemplary method for determining an access node for a wireless device. The method will be discussed with reference to the exemplary communication system 600 illustrated in FIG. 6, however, the method can be implemented with any suitable communication system.

Referring to FIG. 12, steps 1202-1206 may be similar to steps 802-806 of FIG. 8. For example, at step 1202, a fourth signal level of the first signal from the first access node, a fifth signal level of the second signal from the second access node, and a sixth signal level of the third signal from the third access node are ascertained. In this example, wireless device 602 may detect a first signal at a signal level from access node 604, a second signal at a signal level from access node 606, and a third signal at a signal level from access node 608. At step 1204, the ascertained signal levels are sorted. And at step 1206, it is determined that the access node performing power boosting comprises the candidate access node.

At step 1208, a third delta is calculated. For example, a delta (i.e., a difference) between a fourth signal level, such as the fourth signal level ascertained at step 1202, and a fifth signal level, such as the fifth signal level ascertained at step 1202, may be calculated. This can be expressed as: At $T_2$, $SL_5-SL_4=\Delta_3$, where $T_2$=the second time, $SL_4$=the fourth signal level, $SL_5$=the fifth signal level, and $\Delta_3$=the third delta. FIG. 13 further illustrates the third delta. Referring to graph 1300 of FIG. 13, line $T_2$ represents a second time, such as a second point in time after the first point in time. In an example, the intersection of line 1302 and line $T_2$ may represent the signal level of a signal from access node 604 at the second time, such as the signal level ascertained in step 1202. Similarly, the intersection of line 1304 and line $T_2$ may represent the signal level of a signal from access node 606 at the second time, such as the signal level ascertained in step 1202. Accordingly, the difference between the signal level for a signal from access node 604 at the second time and the signal level for a signal from access node 606 at the second time is represented by the third delta 1312.

At step 1210, a fourth delta is calculated. For example, a delta (i.e., a difference) between a fifth signal level, such as the fifth signal level ascertained at step 1202, and a sixth signal level, such as the sixth signal level ascertained at step 1202, may be calculated. This can be expressed as: At $T_2$, $SL_6-SL_5=\Delta_4$, where $T_2$=the second time, $SL_5$=the fifth signal level, $SL_6$=the sixth signal level, and $\Delta_4$=the fourth delta. FIG. 13 further illustrates the fourth delta. Referring to graph 1300 of FIG. 13, line $T_2$ represents a second time, such as a second point in time after the first point in time. In an example, the intersection of line 1304 and line $T_2$ may represent the signal level of a signal from access node 606 at the second time, such as the signal level ascertained in step 1202. Similarly, the intersection of line 1306 and line $T_2$ may represent the signal level of a signal from access node 608 at the second time, such as the signal level ascertained in step 1202. Accordingly, the difference between the signal level for a signal from access node 606 at the second time and the signal level for a signal from access node 608 at the second time is represented by the fourth delta 1314.

At step 1212, a first difference is calculated. For example, a first difference may be calculated as the difference between the first delta and the third delta. This can be expressed as: $\Delta_3-\Delta_1=D_1$, where $\Delta_1$=the first delta, $\Delta_3$=the third delta, and $D_1$=the first difference. At step 1214, a second difference is calculated. For example, a second difference may be calculated as the difference between the second delta and the fourth delta. This can be expressed as: $\Delta_4-\Delta_2=D_2$, where $\Delta_2$=the second delta, $\Delta_4$=the fourth delta, and $D_2$=the second difference.

At step 1216, it is determined whether a handover of the wireless device to the second access node should be performed. For example, it may be determined that a handover of wireless device 202B to access node 206B should be performed when the first difference meets a threshold. For example, it may be determined that a handover of wireless device 602 to access node 606 should be performed when the first difference meets a threshold. This can be expressed as: $D_1>E_1$, where $D_1$=the first difference and $E_1$=a first threshold. The threshold may be a predetermined value, static value, or any other suitable threshold.

In an embodiment, the handover determination may be based on the first difference and the second difference. For example, it may be determined that a handover of wireless device 602 to access node 606 should be performed when the calculated first difference is greater than a first threshold and the calculated second difference is greater than a second threshold. This can be expressed as: $D_1>E_1$ AND $D_2>E_2$, where $D_1$=the first difference. $E_1$=a first threshold, $D_2$=the second difference, and $E_2$=a second threshold. The thresholds may be predetermined values, static values, or any other suitable thresholds.

In an embodiment, a rate may be calculated, and the handover determination may be based on the first difference, the second difference, and the rate. For instance, a rate may indicate a trend for the wireless device, and the decision to perform a handover may be based on the indicated trend. In an example, a change in signal may be calculated as the difference between the first delta and the third delta. In another example, the change in signal may be calculated as the difference between the second delta and the fourth delta. A change in time may be calculated as the difference between a first time, such as the first time at step 1102 of FIG. 11, and a second time, such as the second time at step 1202. The signal difference and the time difference may be used to determine a rate, for instance, by dividing the signal difference by the time difference. In this example, it may be determined that a handover of wireless device 602 to access node 606 should be performed when the calculated first difference is greater than a first threshold, the calculated second difference is greater than a second threshold, and the calculated rate is greater than a third threshold. This can be expressed as: $D_1>E_1$ AND $D_2>E_2$ AND $\Delta_{Signal}/\Delta_{Time}>E_3$, where $D_1$=the first difference, $E_1$=a first threshold, $D_2$=the second difference, and $E_2$=a second threshold, $\Delta_{Signal}$=the change in signal, $\Delta_{Time}$=the change in time, and $E_3$=a third threshold. The thresholds may be predetermined values, static values, or any other suitable thresholds.

When it is determined that a handover should be performed, a handover of the wireless device to the second access node is performed. For example, wireless device 602 may be instructed to change from communication with access node 604 to communicating with access node 606.

While lines 1002 and 1004 of FIG. 10 and lines 1302, 1304, and 1306 of FIG. 13 illustrate a linear change in signal level, it is well understood that such a change in signal level may be non-linear. For example, at a wireless device, a change in detected signal level for a signal from a first access node may be non-linear, and a change in detected signal level for a signal from a second access node may be non-linear, and any delta values calculated from these signal levels, such as delta values or difference values, may comprise any suitable values. In addition, comparisons, such as the comparisons between thresholds, deltas, differences, signal levels, or any combination of these, that comprise "greater than" or "less than" comparisons, such as ">" or "<", may similarly be "greater than or equal to" or "less than or equal to" comparisons, such as ">=" or "<=".

Although the exemplary methods described comprise steps performed in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 14:
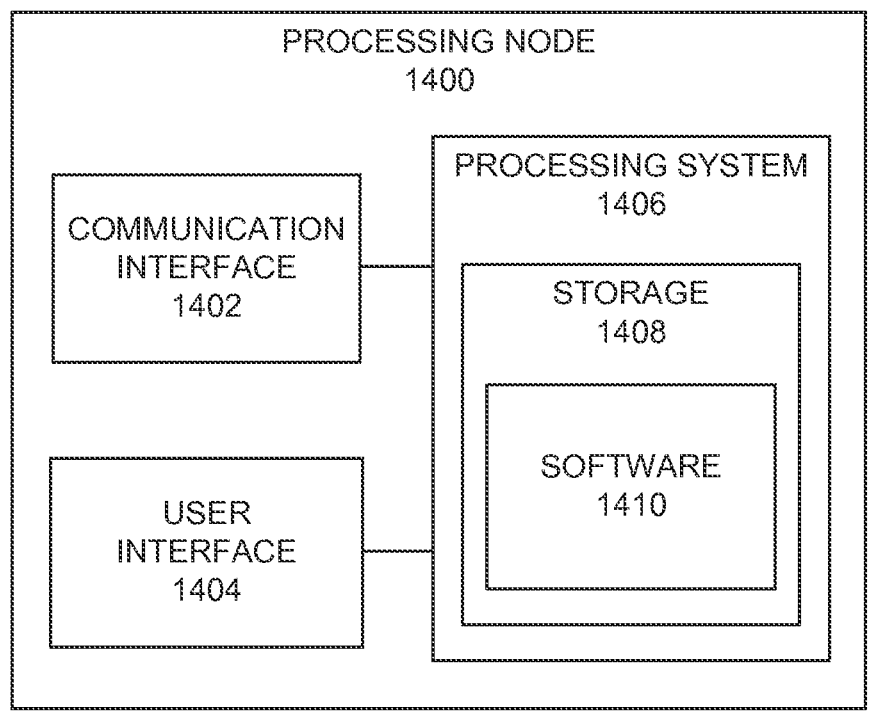
FIG. 14 illustrates an exemplary processing node.

FIG. 14 illustrates an exemplary processing node 1400 in a communication system. Processing node 1400 comprises communication interface 1402, user interface 1404, and processing system 1406 in communication with communication interface 1402 and user interface 1404. Processing node 1400 can be configured to determine a communication access node for a wireless device. Processing system 1406 includes storage 1408, which can comprise a disk drive, flash drive, memory circuitry, or other memory device. Storage 1408 can store software 1410 which is used in the operation of the processing node 1400. Storage 1408 may include a disk drive, flash drive, data storage circuitry, or some other memory apparatus. Software 1410 may include computer programs, firmware, or some other form of machine-readable instructions, including an operating system, utilities, drivers, network interfaces, applications, or some other type of software. Processing system 1406 may include a microprocessor and other circuitry to retrieve and execute software 1410 from storage 1408. Processing node 1400 may further include other components such as a power management unit, a control interface unit, etc., which are omitted for clarity. Communication interface 1402 permits processing node 1400 to communicate with other network elements. User interface 1404 permits the configuration and control of the operation of processing node 1400.

Examples of processing node 1400 include controller node 510 and gateway node 512. Processing node 1400 can also be an adjunct or component of a network element, such as an element of access nodes 104, 106, 504, 506, or 508. Processing node 1400 can also be another network element in a communication system. Further, the functionality of processing node 1400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a serving access node for a wireless device, the method comprising:
   receiving, at a source access node, a target signal level of a target access node and a source signal level of the source access node from a wireless device in communication with the source access node;
   determining that the target access node is operating in a power boosted mode;
   instructing the wireless device to remain in communication with the source access node when the target signal level exceeds the source signal level by less than a first criteria, wherein the first criteria is determined based on a past target signal level and a past source signal level received from the wireless device such that the first criteria is based on a first delta between the past target signal level and the past source signal level.

2. The method of claim 1, further comprising instructing the wireless device to change from communicating with the source access node to the target access node when the target signal level exceeds the source signal level by the first criteria.

3. The method of claim 1, wherein the first criteria comprises a sum of the first delta and a first offset.

4. The method of claim 1, wherein the first criteria is calculated based on the first delta, a delta time, and a threshold rate.

5. The method of claim 4, wherein the delta time comprises the difference between a first time when the past target signal level and the past source signal are received from the wireless device and a second time when the target signal level and the source signal level are received from the wireless device.

6. The method of claim 1, further comprising:
   determining the target signal level exceeds the source signal level by less than the first criteria;
   receiving, at a source access node, an updated target signal level of the target access node and an updated source signal level of the source access node from the wireless device;
   instructing the wireless device to remain in communication with the source access node when the updated target signal level exceeds the updated source signal level by less than a second criteria.

7. The method of claim 6, wherein the second criteria is determined based a second delta between the target signal level and the source signal level.

8. The method of claim 7, wherein the second criteria comprises a sum of the second delta and a second offset.

9. The method of claim 6, wherein the second criteria is calculated based on the first delta, a delta time, and a threshold rate.

10. The method of claim 9, wherein the delta time comprises the difference between a first time when the past target signal level and past source signal are received from the wireless device and a third time when the updated target signal level and the updated source signal level are received from the wireless device.

11. A system for determining an access node for a wireless device, the system comprising:
    a processing node comprising a processor, the processing node configured to:
        receive, at a source access node, a target signal level of a target access node and a source signal level of the source access node from a wireless device in communication with the source access node;
        determine that the target access node is operating in a power boosted mode;
        instruct the wireless device to remain in communication with the source access node when the target signal level exceeds the source signal level by less than a first criteria, wherein the first criteria is determined based on a past target signal level and a past source signal level received from the wireless device such that the first criteria is based on a first delta between the past target signal level and the past source signal level.

12. The system of claim 11, wherein the processing node is further configured to:
    instruct the wireless device to change from communicating with the source access node to the target access node when the target signal level exceeds the source signal level by the first criteria.

13. The system of claim 11, wherein the first criteria comprises a sum of the first delta and a first offset.

14. The system of claim 11, wherein the first criteria is calculated based on the first delta, a delta time, and a threshold rate.

15. The system of claim 14, wherein the delta time comprises the difference between a first time when the past target signal level and the past source signal are received from the wireless device and a second time when the target signal level and the source signal level are received from the wireless device.

16. The system of claim 11, wherein the processing node is further configured to:
    determine the target signal level exceeds the source signal level by less than the first criteria;
    receive, at a source access node, an updated target signal level of the target access node and an updated source signal level of the source access node from the wireless device;
    instruct the wireless device to remain in communication with the source access node when the updated target signal level exceeds the updated source signal level by less than a second criteria.

17. The system of claim 16, wherein the second criteria is determined based a second delta between the target signal level and the source signal level.

18. The system of claim 17, wherein the second criteria comprises a sum of the second delta and a second offset.

* * * * *